(12) United States Patent
Fan et al.

(10) Patent No.: US 12,299,007 B2
(45) Date of Patent: May 13, 2025

(54) AUTOMATICALLY DRAWING INFOGRAPHICS FOR STATISTICAL DATA BASED ON A DATA MODEL

(71) Applicant: International Business Machines Corporation, Armonk, NY (US)

(72) Inventors: Ye Fan, Xi'an (CN); Qi Mao, Xi'an (CN); Juan Wu, Xi'an (CN); Jia Zhong Wu, Xi'an (CN); Long Fan, Xi'an (CN); Chong Liu, Xi'an (CN); Wen Pei Yu, Xi'an (CN); Yang Yang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 17/581,646

(22) Filed: Jan. 21, 2022

(65) Prior Publication Data

US 2023/0237076 A1    Jul. 27, 2023

(51) Int. Cl.
*G06F 16/28* (2019.01)
*G06T 11/20* (2006.01)

(52) U.S. Cl.
CPC .......... *G06F 16/287* (2019.01); *G06T 11/206* (2013.01)

(58) Field of Classification Search
CPC .............................. G06F 16/287; G06T 11/206
See application file for complete search history.

(56) References Cited

U.S. PATENT DOCUMENTS 9,824,469 B2    11/2017  Gibson et al.
10,339,181 B1 *  7/2019  Singh .................... G06F 16/904
10,380,778 B2    8/2019  Apte et al.
11,093,703 B2    8/2021  Viegas et al.
2004/0083452 A1 *  4/2004  Minor .................... G16B 50/20
                                                        717/109
2012/0313947 A1   12/2012  Rope et al.
(Continued)

OTHER PUBLICATIONS

Snowflake, "Visualizing Data," https://docs.snowflake.com/en/user-guide/ui-snowsight-visualizations.html, 2021, pp. 1-6.
(Continued)

*Primary Examiner* — Etienne P Leroux
*Assistant Examiner* — Husam Turki Samara
(74) *Attorney, Agent, or Firm* — Shackelford, McKinley & Norton, LLP; Robert A. Voigt, Jr.

(57) ABSTRACT

A computer-implemented method, system and computer program product for automatically drawing infographics. Variables of a dataset are received from a computing device that were selected by the user of the computing device. For those selected variables that are associated with a data model, a procedure to draw infographics for variables assigned or not assigned the role of a target using the data model associated with each of the variables assigned or not assigned the role of target, respectively, is implemented. Alternatively, if the selected variables are not associated with a data model, then such variables are assigned a level of measurement as well as assigned the role of input. Such assignments become the data model which, along with the metadata (e.g., values of the variable) obtained by parsing the original data, are used to implement the procedure to draw infographics for variables not assigned the role of a target.

20 Claims, 15 Drawing Sheets

(56) References Cited

U.S. PATENT DOCUMENTS

2015/0356163 A1* 12/2015 Matteson .............. G06F 16/285
   707/738
2020/0074323 A1* 3/2020 Martin .................. G06F 17/142
2022/0342873 A1* 10/2022 Indurkhya ......... G06F 16/24522

OTHER PUBLICATIONS

Anton, "Charted," https://github.com/charted-co/charted, 2017, pp. 1-3.

* cited by examiner

AUTOMATICALLY DRAWING INFOGRAPHICS FOR STATISTICAL DATA BASED ON A DATA MODEL

TECHNICAL FIELD

The present disclosure relates generally to statistical visualization tools, and more particularly to automatically drawing infographics for statistical data based on a data model.

BACKGROUND

Statistical visualization tools are utilized by users to visualize data, such as statistical data, in order to obtain a clear opinion based on the data analysis. Such tools enable users to communicate information clearly and efficiently via statistical graphs, plots and information graphics. Visualization helps users analyze and reason about data using dots, lines, bars, etc. and makes complex data more accessible, understandable and usable.

SUMMARY

In one embodiment of the present disclosure, a computer-implemented method for automatically drawing infographics comprises receiving selected variables from a dataset to be utilized for generating infographics. The method further comprises determining whether the received variables are associated with a data model, where the data model classifies variables based on levels of measurement and role. The method additionally comprises determining whether each of the received variables that are associated with the data model have been assigned a role of a target. Furthermore, the method comprises implementing a procedure to draw infographics for variables not assigned the role of the target using the data model associated with each of the variables not assigned the role of the target in response to not being assigned the role of the target. Additionally, the method comprises implementing a procedure to draw infographics for variables assigned the role of the target using the data model associated with each of the variables assigned the role of the target in response to being assigned the role of the target.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
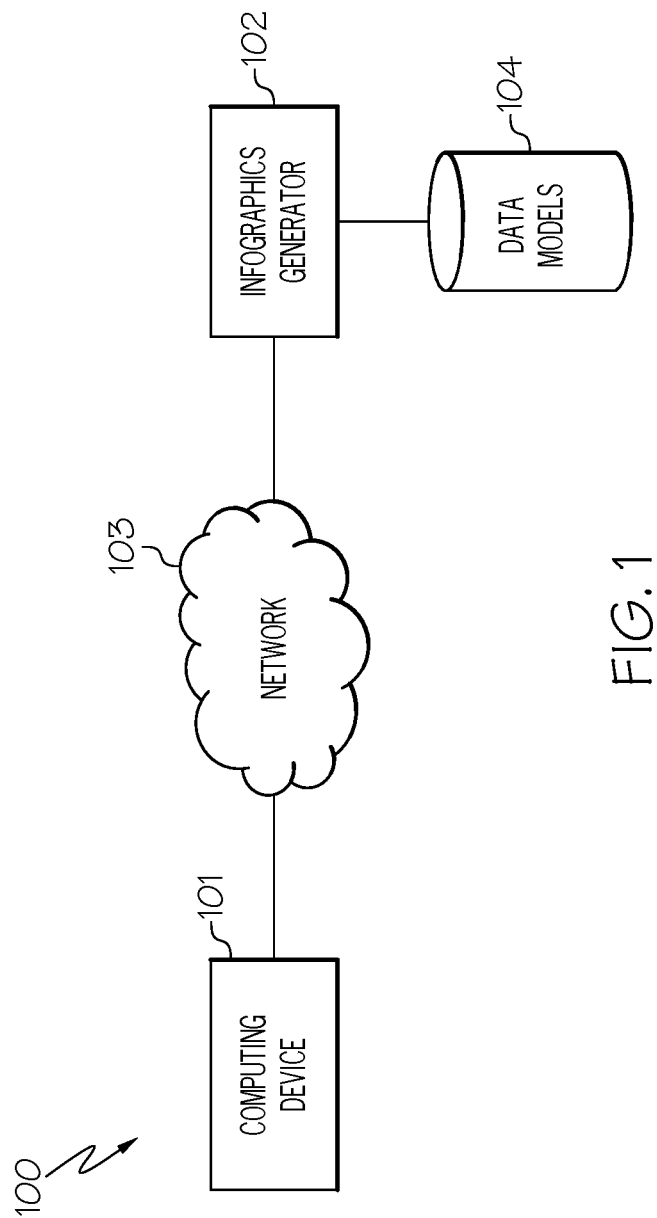
FIG. 1 illustrates a communication system for practicing the principles of the present disclosure in accordance with an embodiment of the present disclosure.

As stated in the Background section, statistical visualization tools are utilized by users to visualize data, such as statistical data, in order to obtain a clear opinion based on the data analysis. Such tools enable users to communicate information clearly and efficiently via statistical graphs, plots and information graphics. Visualization helps users analyze and reason about data using dots, lines, bars, etc. and makes complex data more accessible, understandable and usable.

Traditionally, users have to decide which particular infographic (e.g., chart) to use to visualize the dataset being analyzed by the user. "Infographics," as used herein, refer to a visual image, such as a chart or diagram, used to represent information or data. Unfortunately, the user may not have experience or knowledge as to which particular infographic is the best to be utilized to visualize the dataset in order for the user to clearly understand and analyze the dataset.

As a result, data applications (e.g., Microsoft® Excel® 365) may attempt to assist the user by suggesting an infographic (e.g., chart) to use to visualize the dataset to be analyzed by the user. Such a suggestion may simply be based on the variables selected by the user to be visualized. However, by simply relying on the selected variables, such as the names of the selected variables, the suggested infographic often does not effectively visualize the dataset in a manner that allows the user to clearly understand and analyze the dataset.

Furthermore, in cases in which the user selects continuous variables (numeric variables that have an infinite number of values between any two values), applications may attempt to assist the user by drawing a scatter plot of such continuous variables to display their relationships. Unfortunately, such scatter plots display numerous relationships which may not be relevant thereby causing confusion and frustration for the user.

As a result, there is not currently a means for automatically drawing infographics, such as based on variables selected by the user from a dataset, in a manner that allows the user to clearly understand and analyze the dataset.

The embodiments of the present disclosure provide a means for automatically drawing infographics of a dataset using a data model associated with the variables selected by the user that results in generating infographics that more clearly and understandably displays the dataset.

In some embodiments of the present disclosure, the present disclosure comprises a computer-implemented method, system and computer program product for automatically drawing infographics. In one embodiment of the present disclosure, variables of a dataset are received from a computing device that were selected by the user of the computing device. For each of the variables that were selected by the user, a determination is made as to whether a data model is associated with the selected variable. A "variable," as used herein, refers to a symbol and placeholder for an expression or quantity that varies as an arbitrary or intermediate object. It may represent a number, vector, matrix, function, argument, etc. of a function, set or element of a set. A "data model," as used herein, refers to an abstract model that organizes elements of data and standardizes how they relate to one another and to the properties of real-world entities. In one embodiment, the data model includes classifications of the variables used in datasets, such as the type of variable, the role of the variable, the level of measurement of the variable, etc. For those selected variables that are associated with a data model, which may have been previously stored in a database, a determination is made as to whether the variable has been assigned the role of a target. If so, then a procedure to draw infographics for variables assigned the role of a target using the data model associated with each of the variables assigned the role of target is implemented. If, however, the variable has not been assigned the role of a target, then a procedure to draw infographics for variables not assigned the role of a target using the data model associated with each of the variables not assigned the role of target is implemented. In one embodiment, such infographics are drawn using the metadata (e.g., values of the variable) obtained by parsing the original data (original dataset). Alternatively, if the selected variables are not associated with a data model, then such variables are assigned a level of measurement (e.g., continuous, nominal) based on whether there is a unique value of the selected variable that is less than a threshold value, which may be user-specified, as well as assigned the role of input. Such assignments (assignment of the level of measurement and role) become the data model which, along with the metadata (e.g., values of the variable) obtained by parsing the original data, are used to implement the procedure to draw infographics for variables not assigned the role of a target. In this manner, infographics are automatically drawn based on variables selected by the user from a dataset in a manner that allows the user to clearly understand and analyze the dataset.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a computing device 101 connected to an infographics generator 102 via a network 103. It is noted that both computing device 101 and the user of computing device 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and infographics generator 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, a user of computing device 101 selects variables from a dataset to be provided to infographics generator 102, which may utilize data models stored in database 104 connected to infographics generator 102, to generate infographics that more clearly and understandably displays the dataset than prior techniques. "Infographics," as used herein, refer to a visual image, such as a chart or diagram, used to represent information or data. A "dataset," as used herein, refers to a collection of data. For example, in the case of tabular data, a dataset corresponds to one or more database tables, where every column of a table represents a particular variable, and each row corresponds to a given record of the dataset in question. A "variable," as used herein, refers to a symbol and placeholder for an expression or quantity that varies as an arbitrary or intermediate object. It may represent a number, vector, matrix, function, argument, etc. of a function, set or element of a set. A "data model," as used herein, refers to an abstract model that organizes elements of data and standardizes how they relate to one another and to the properties of real-world entities. For example, a data model may specify that the data element representing a car be composed of a number of other elements which, in turn, represent the color and size of the car and define its owner. In one embodiment, the data model of the present disclosure includes classifications of the variables used in datasets, such as the type of variable, the role of the variable, the level of measurement of the variable, etc.

The "type of variable," as used herein, refers to a classification of the variable, such as "categorical," "discrete," and "continuous." A "categorical variable," as used herein, refers to a variable that contains a finite number of categories or distinct groups. Categorical data may not have a logical order. For example, categorical predictors include material type and payment method. A "discrete variable," as used herein, refers a numeric variable has a countable number of values between any two values. A discrete variable is numeric. For example, the number of customer complaints or the number of flaws or defects are examples of a discrete variable. A "continuous variable," as used herein, refers to a numeric variable that has an infinite number of values between any two values. A continuous variable can be numeric or date/time. For example, the length of a part or the date and time a payment is received are examples of a continuous variable.

The "role of the variable," as used herein, refers to the use of the variable in the analysis. For example, a variable may be assigned one of the following roles: input, target, both, none, partition, and split. The role of "input" refers to the variable being used as a predictor (independent variable). The role of "target" refers to the variable being used as an outcome (dependent variable). The role of "both" refers to the variable being used as both a predictor and an outcome (independent and dependent variable). The role of "none" refers to the variable having no role assignment. The role of "partition" refers to a variable that will partition the data into separate samples. The role of "split" is used with IBM® SPSS® Modeler involving the analysis of subsets of data without separating the data into two different files.

The "level of measurement," as used herein, refers to how precisely the variable is recorded. In one embodiment, there are three different levels of measurement, namely, nominal, ordinal and continuous (which includes what may be referred to as "interval" and "ratio"). In a "nominal" level of measurement, the number in the variable is used only to classify the data. In this level of measurement, words, letters and alpha-numeric symbols can be used. In the "ordinal" level of measurement, the ordered relationship among the variable's observations are depicted. For example, suppose a student scores the highest grade of 100 in the class. In this case, the student would be assigned the first rank. Then, another classmate scores the second highest grade of a 92. This student would be assigned the second rank and so forth. A "continuous" level of measurement includes both the interval and ratio levels of measurements. The interval level of measurement not only classifies and orders the measurements, but it also specifies that the distances between each interval on the scale are equivalent along the scale from low interval to high interval. For example, an interval level of measurement could be the measurement of temperature change, where, for example, the distance between 20° C. and 22° C. is the same as the distance between 26° C. ad 28° C. In the ratio level of measurement, the observations, in addition to having equal intervals, can have a value of zero as well. In the ratio level of measurement, the divisions between the points on the scale have an equivalent distance between them.

Figure 2:
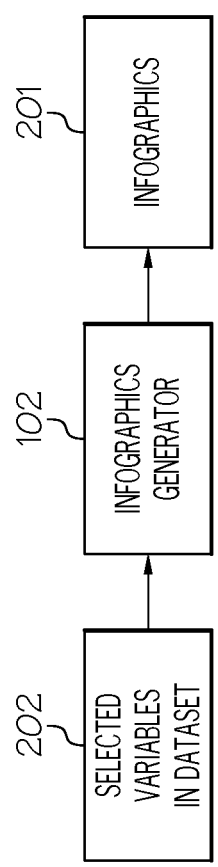
FIG. 2 illustrates the infographics generator generating infographics from user-selected variables from a dataset in accordance with an embodiment of the present disclosure.

A further illustration of infographics generator 102 generating infographics from user-selected variables from a dataset is shown in FIG. 2.

FIG. 2 illustrates infographics generator 102 generating infographics from user-selected variables from a dataset in accordance with an embodiment of the present disclosure.

Referring to FIG. 2, in conjunction with FIG. 1, infographics generator 102 generates infographics 201 from the user-selected variables 202 in the dataset, such as by using the data model associated with the user-selected variables or by defining the level of measurement and roles of the user-selected variables for those variables that are not already associated with a data model as discussed further below. Furthermore, in one embodiment, such infographics 201 are also generated using the metadata (e.g., values of the user-selected variables) obtained by parsing the original data (original dataset). In one embodiment, such user-selected variables 202 are provided to infographics generator 102 by computing device 101 of the user. In one embodiment, infographics 201 generated by infographics generator 102 are transmitted to computing device 101 in order to be displayed on the display of computing device 101.

A description of the software components of infographics generator 102 is provided below in connection with FIG. 3 and a description of the hardware configuration of infographics generator 102 is provided further below in connection with FIG. 4.

Referring again to FIG. 1, system 100 is not to be limited in scope to any one particular network architecture. System 100 may include any number of computing devices 101, infographics generators 102, networks 103, and databases 104.

A discussion regarding the software components used by infographics generator 102 for automatically generating or drawing infographics from user-selected variables based on a data model is provided below in connection with FIG. 3.

Figure 3:
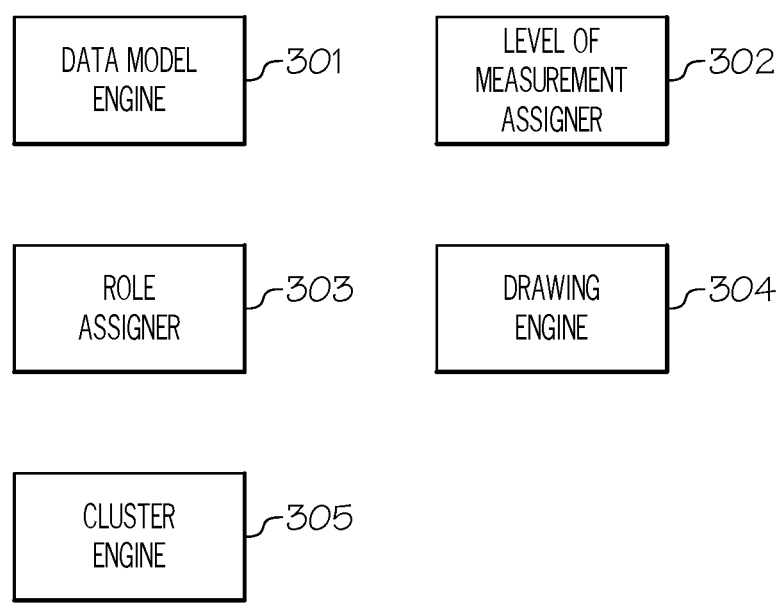
FIG. 3 is a diagram of the software components of the infographics generator for automatically generating or drawing infographics from user-selected variables based on a data model in accordance with an embodiment of the present disclosure.

FIG. 3 is a diagram of the software components of infographics generator 102 (FIGS. 1 and 2) for automatically generating or drawing infographics from user-selected variables based on a data model in accordance with an embodiment of the present disclosure.

Referring to FIG. 3, in conjunction with FIGS. 1-2, infographics generator 102 includes a data model engine 301 configured to determine if a data model is associated with a user-selected variable, such as a user-selected variable received from computing device 101. In one embodiment, database 104 is populated with variables and associated data models. As discussed above, a "variable," as used herein, refers to a symbol and placeholder for an expression or quantity that varies as an arbitrary or intermediate object. It may represent a number, vector, matrix, function, argument, etc. of a function, set or element of a set. A "data model," as used herein, refers to an abstract model that organizes elements of data and standardizes how they relate to one another and to the properties of real-world entities. For example, a data model may specify that the data element representing a car be composed of a number of other elements which, in turn, represent the color and size of the car and define its owner. In one embodiment, the data model of the present disclosure includes classifications of the variables used in datasets, such as the type of variable, the role of the variable, the level of measurement of the variable, etc. In one embodiment, such variables and associated data models are populated in database 104 by an expert. In one embodiment, such data models are represented as records in database 104 and identified based on the name of the variable, (identifier of the variable in syntax), which is included in the record. In one embodiment, data model engine 301 is configured to identify the relevant record based on matching the name of the variable selected by the user with the variable identified in the record stored in database 104 using natural language processing.

In one embodiment, such variables and associated data models are populated in database 104 by data model engine 301 based on previous assignments of the level of measurements and roles to the variables as discussed further below. In one embodiment, such assignments correspond to the data model for such variables, which may be represented as records in database 104 and identified based on the name of the associated variable.

In one embodiment, data model engine 301 is configured to extract the relevant statistical information about the variable from the data model for those variables with an associated data model, such as by extracting the level of measurement and role of the variable. As discussed above, in one embodiment, data model engine 301 identifies the appropriate data model stored in database 104 based on matching the name of the variable selected by the user with the name of the variable listed in the data model, which may be represented as a record in database 104, using natural language processing.

Data model engine 301 is configured to perform the functions discussed above, such as determining if a data model is associated with a user-selected variable and extracting relevant statistical information about the variable from the data model, using various software tools, including, but not limited to, IBM® SPSS®, GraphPad Prism®, Minitab®, NVivo®, etc.

As previously discussed, data model engine 301 determines if a data model is associated with a user-selected variable, such as a user-selected variable received from computing device 101. If there is not a data model associated with the user-selected variable, then the statistical aspects of the variable, such as the level of measurement and role of the variable, are assigned to the variable, which may later be stored in database 104 as a record (record for a data model) associated with the variable for later utilization. In such a record of the data model, the record may include an identification of the variable, such as a name, to be associated with the variable thereby allowing it to be discoverable by data model engine 301 as discussed above.

In one embodiment, the level of measurement and the role of the variable are assigned to the variable that is not associated with a data model using the software components of the level of measurement assigner 302 and the role assigner 303 of infographics generator 102 as discussed below. By assigning the level of measurement and a role to the variables not associated with a data model, such statistical information forms a data model for such variables.

In one embodiment, level of measurement assigner 302 is configured to assign a level of measurement for the variable not associated with a data model. As discussed above, a "level of measurement," as used herein, refers to how precisely the variable is recorded. In one embodiment, there are three different levels of measurement, namely, nominal, ordinal and continuous (which includes what may be referred to as "interval" and "ratio"). In a "nominal" level of measurement, the number in the variable is used only to classify the data. In this level of measurement, words, letters and alpha-numeric symbols can be used. In the "ordinal" level of measurement, the ordered relationship among the variable's observations are depicted. For example, suppose a student scores the highest grade of 100 in the class. In this case, the student would be assigned the first rank. Then, another classmate scores the second highest grade of a 92. This student would be assigned the second rank and so forth. A "continuous" level of measurement includes both the interval and ratio levels of measurements. The interval level of measurement not only classifies and orders the measurements, but it also specifies that the distances between each interval on the scale are equivalent along the scale from low interval to high interval. For example, an interval level of measurement could be the measurement of temperature change, where, for example, the distance between 20° C. and 22° C. is the same as the distance between 26° C. ad 28° C. In the ratio level of measurement, the observations, in addition to having equal intervals, can have a value of zero as well. In the ratio level of measurement, the divisions between the points on the scale have an equivalent distance between them.

In one embodiment, level of measurement assigner 302 assigns the level of measurement for the variable not associated with a data model to be continuous in response to there not being a unique value of the variable being less than a threshold value, which may be user-selected. If, on the other hand, there is a unique value of the variable that is less than the threshold value, then level of measurement assigner 302 assigns the level of measurement for the variable to be nominal.

Level of measurement assigner 302 is configured to perform the functions discussed above, using various software tools, including, but not limited to, IBM® SPSS®, GraphPad Prism®, RStudio®, Stata®, Minitab®, JMP®, G*Power®, OriginPro®, etc.

In one embodiment, role assigner 303 is configured to assign a role for the variable not associated with a data model. As discussed above, the "role of the variable," as used herein, refers to the use of the variable in the analysis. For example, a variable may be assigned one of the following roles: input, target, both, none, partition, and split. The role of "input" refers to the variable being used as a predictor (independent variable). The role of "target" refers to the variable being used as an outcome (dependent variable). The role of "both" refers to the variable being used as both a predictor and an outcome (independent and dependent variable). The role of "none" refers to the variable having no role assignment. The role of "partition" refers to a variable that will partition the data into separate samples. The role of "split" is used with IBM® SPSS® Modeler involving the analysis of subsets of data without separating the data into two different files.

In one embodiment, role assigner 303 assigns, by default, the role of the variable not associated with the data model to be input. In one embodiment, the default action performed by role assigner 303 is not to be limited in scope to assigning the role of input but may include a different role as determined by an expert.

Role assigner 303 is configured to perform the functions discussed above, using various software tools, including, but not limited to, IBM® SPSS®, GraphPad Prism®, RStudio®, Stata®, Minitab®, JMP®, G*Power®, OriginPro®, etc.

As stated above, data model engine 301 is configured to extract the relevant statistical information about the variable from the data model for those variables with an associated data model, such as by extracting the level of measurement and role of the variable. In one embodiment, data model engine 301 identifies the appropriate data model stored in database 104 based on matching the name of the variable selected by the user with the name of the variable listed in the data model, which may be represented as a record in database 104, using natural language processing.

If data model engine 304 determines that the user-selected variable with the associated data model is not assigned the role of a target, then drawing engine 304 of infographics generator 102 draws different infographics with variables that are not assigned the role of a target. Such a procedure is also utilized when the user-selected variable is not originally associated with a data model. Conversely, if the user-selected variable with the associated data model is assigned the role of a target, then drawing engine 304 of infographics generator 102 draws different infographics with variables that are assigned the role of a target.

For variables that are assigned the role of target, in one embodiment, drawing engine 304 is configured to draw at least the following infographics: a scatter plot for variables assigned the level of measurement of continuous and assigned the role of target, a bar plot for variables assigned the levels of measurement of continuous and ordinal and assigned the role of target, a box plot for variables assigned the levels of measurement of continuous and nominal and assigned the role of target and a relationship map for variables assigned the levels of measurement of ordinal and nominal in the roles of target and input.

In one embodiment, drawing engine 304 utilizes metadata (e.g., values of the variable), which is obtained by parsing the original data (original dataset), to draw such infographics (e.g., scatter plot, bar plot, box plot, relationship map). In one embodiment, such metadata includes structured information describing the parameter, including dates, title, creators, etc. in addition to the values of the parameter. In one embodiment, such metadata is stored within the dataset. In one embodiment, such metadata is stored in a database, such as a data dictionary or metadata repository. In one embodiment, such metadata associated with the dataset is parsed by drawing engine 304 to obtain the information discussed above using a metadata parser, such as mp from DataONE. In one embodiment, such metadata is extracted using various software tools, including, but not limited to, Alation®, Collibra®, Erwin®, IBM® InfoSphere®, Infogix®, Informatica®, Octopai, OvalEdge®, etc.

A "scatter plot," as used herein, refers to a graph in which the values of two variables are plotted along two axes, the pattern of the resulting points revealing any correlation present. In one embodiment, such a scatter plot uses Cartesian coordinates to display values for typically two variables for a set of data. In one embodiment, the data is displayed as a collection of points, each having the value of one variable determining the position on the horizontal axis and the value of the other variable determining the position on the vertical axis.

A "bar plot," as used herein, refers to an infographic that presents categorical data with rectangular bars with heights or lengths proportional to the values that they represent. In one embodiment, the bars can be plotted vertically or horizontally.

A "box plot," as used herein, refers to an infographic that depicts groups of numerical data through their quartiles. It provides a visual representation of statistical data based on the minimum, first quartile, median, third quartile, and maximum. Outliers can be plotted on box plots as individual points. In one embodiment, the distances between different box parts represent the degree of data dispersion and data asymmetry to identify outliers. It is possible to compare point values between themselves (in a single-series box plot) and also analyze the differences between values inside the categories (in multi-series box plots). In one embodiment, in case of several series, points are grouped by category.

A "relationship map," as used herein, refers to an infographic that allows one to visualize connections, such as between variables with the roles of target and input. In one embodiment, such relationship maps are useful for determining how variables relate to each other by providing a visual representation of the connections and influences that each node and link has over each other. In one embodiment, relationship maps visually represent connections and influences through nodes and links. Nodes represent variables and variable categories; links represent the strength of influence between nodes. In one embodiment, larger nodes and thicker link lines represent stronger connections and influence. Smaller nodes and thinner link lines represent weaker connections and influence.

Drawing engine 304 is configured to perform such drawings discussed above, using various software tools, including, but not limited to, Matplotlib, Tableau®, JMP®, Grapher, GNU Octave, GraphPad Prism®, IBM® SPSS®, etc.

In one embodiment, drawing engine 304 is configured to draw at least the following infographics for variables that are not assigned the role of target: a relationship map for variables with assigned levels of measurement of nominal and ordinal, a histogram for each variable with the assigned level of measurement of continuous, a pie graph for each variable with the assigned level of measurement of nominal, a bar graph for each variable with the assigned level of measurement of ordinal, etc. In one embodiment, drawing engine 304 is configured to draw a scatter plot for each pair of continuous variables that do not have a value that exceeds a threshold value, which may be user-selected.

As discussed above, in one embodiment, drawing engine 304 utilizes metadata (e.g., values of the variable), which is obtained by parsing the original data (original dataset), to draw such infographics (e.g., histography, pie graph, bar graph, scatter plot). In one embodiment, such metadata includes structured information describing the parameter, including dates, title, creators, etc. in addition to the values of the parameter. In one embodiment, such metadata is stored within the dataset. In one embodiment, such metadata is stored in a database, such as a data dictionary or metadata repository. In one embodiment, such metadata associated with the dataset is parsed by drawing engine 304 to obtain the information discussed above using a metadata parser, such as mp from DataONE. In one embodiment, such metadata is extracted using various software tools, including, but not limited to, Alation®, Collibra®, Erwin®, IBM® InfoSphere®, Infogix®, Informatica®, Octopai, OvalEdge®, etc.

A "histogram," as used herein, refers to an infographic that is an approximate representation of a distribution of numerical data. In one embodiment, a range of values is divided into a series of intervals. The number of values that fall within each interval are then counted and placed in "bins." The bins may be specified as consecutive, non-overlapping intervals of a variables. The bins (intervals) may be adjacent and may be equal or different size.

A "pie graph," as used herein, refers to an infographic that is a circular statistical graphic, which is divided into slices to illustrate numeric proportion. In one embodiment, in a pie graph, the arc length of each slice is proportional to the quantity it represents.

A "bar graph," as used herein, refers to a "bar plot" as discussed above.

Drawing engine 304 is configured to perform such drawings discussed above, using various software tools, including, but not limited to, Matplotlib, Tableau®, JMP®, Grapher, GNU Octave, GraphPad Prism®, IBM® SPSS®, etc.

In connection with the procedure for drawing infographics without a target variable, cluster engine 305 of infographic generator 102 is configured to determine if there is a value of a continuous variable that exceeds a threshold value, which may be user-selected. If such a situation occurs, then, for those continuous variables with a value that exceeds the threshold value, cluster engine 305 identifies the clusters of variables to be used by drawing engine 304 to draw a scatter plot as discussed below. Such a process may be referred to herein as the "pair-group search strategy."

In one embodiment, cluster engine 305 identifies the clusters of variables to be used by drawing engine 304 to draw a scatter plot by grouping continuous variables with a value that exceeds a threshold value, which may be user-selected, into pairs.

For example, suppose the variables A, B, C, D, E and F are continuous variables with a value that exceeds the threshold value. Cluster engine 305 may then group such variables into the following pairs: (A, B), (C, D), (E, F).

Cluster engine 305 then computes the correlation rate for each pair of continuous variables. The "correlation rate," as said herein, refers to a measure of how strong a relationship is between two variables. In one embodiment, such correlation rates may be determined by computing the Euclidean distance or cosine distance between such variables. The Euclidean distance refers to the distance between two points in Euclidean space, which corresponds to the length of a line segment between the two points, such as the points of two variables. Cosine distance is a measure of similarity between two non-zero vectors of the variables of an inner product space. Cosine distance is equal to the cosine of the angle between them, which is also the same as the inner product of the same vectors normalized to both have length 1.

If the computed correlation rate exceeds the threshold value, which may be user-selected, then cluster engine 305 has identified a pair of continuous variables as belonging to a cluster. Otherwise, cluster engine 305 has identified a pair of continuous variables as not belonging to a cluster. For instance, referring to the above example, after comparing the correlation rate for each pair of continuous variables with the threshold value, variable pairs [A, B] and [E, F] may be deemed to be groups of clusters, whereas, variables C, D may be deemed to not belong to a cluster.

Cluster engine 305 may then, assuming that all continuous variables belonging to a cluster or not belonging to a cluster have not been compared, select a variable in a cluster to be paired in a new group with a variable not belonging to a cluster.

For instance, referring to the above example, new groups of variable pairs may consist of (A, C) and (D, E). Cluster engine 305 may then compute the correlation rate for each pair of continuous variables in each of these new groups as discussed above. If the correlation rate is greater than the threshold value, which may be user-specified, then such variables are in the same cluster. Otherwise, they are deemed to not belong to a cluster. For instance, referring to the above example, after comparing the correlation rate for each pair of continuous variables in each of these new groups, variable pairs [A, B, C] and [E, F] may be deemed to be groups of clusters, whereas, variable D may be deemed to not belong to a cluster.

The above process continues until all the continuous variables belonging to a cluster or not belonging to a cluster have been compared. Once all the continuous variables belonging to a cluster or not belonging to a cluster have been compared, cluster engine 305 then requests drawing engine 304 to draw a scatter plot for the variables in each cluster. For instance, referring to the above example, drawing engine 304 draws a scatter plot for clusters (A, B), (A, C), (B, C) and (E, F). By utilizing the pair-group search strategy, the complexity of correlation analysis and in selecting the appropriate continuous variables to be drawn, such as in a scatter plot, is greatly reduced thereby improving the clarity and understandability of the infographics, such as a scatter plot.

Cluster engine 305 is configured to perform the functions discussed above, using various software tools, including, but not limited to, ArcGis® Pro, IBM® SPSS® Modeler, RapidMiner®, Alteryx®, RStudio®, Tableau®, etc.

A further description of these and other functions is provided below in connection with the discussion of the method for automatically drawing infographics based on data models associated with the selected variables of the dataset.

Prior to the discussion of the method for automatically drawing infographics based on data models associated with the selected variables of the dataset, a description of the hardware configuration of infographics generator 102 is provided below in connection with FIG. 4.

Figure 4:
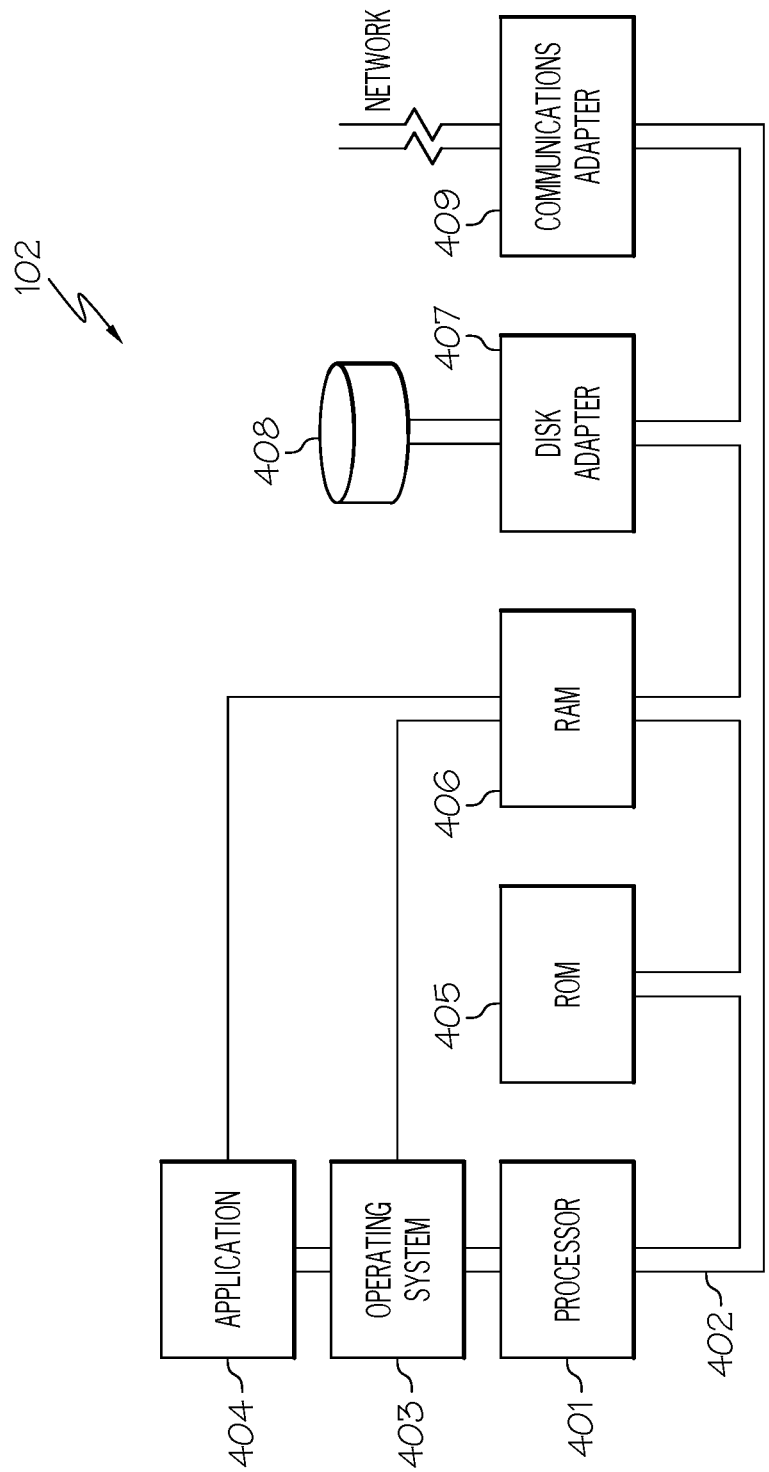
FIG. 4 illustrates an embodiment of the present disclosure of the hardware configuration of the infographics generator which is representative of a hardware environment for practicing the present disclosure.

Referring now to FIG. 4, FIG. 4 illustrates an embodiment of the present disclosure of the hardware configuration of infographics generator 102 (FIG. 1) which is representative of a hardware environment for practicing the present disclosure.

Infographics generator 102 has a processor 401 connected to various other components by system bus 402. An operating system 403 runs on processor 401 and provides control and coordinates the functions of the various components of FIG. 4. An application 404 in accordance with the principles of the present disclosure runs in conjunction with operating system 403 and provides calls to operating system 403 where the calls implement the various functions or services to be performed by application 404. Application 404 may include, for example, data model engine 301 (FIG. 3), level of measurement assigner 302 (FIG. 3), role assigner 303 (FIG. 3), drawing engine 304 (FIG. 3) and cluster engine 305 (FIG. 3). Furthermore, application 404 may include, for example, a program for automatically drawing infographics based on data models associated with the selected variables of the dataset as discussed further below in connection with FIGS. 5-11, 12A-12B and 13-15.

Referring again to FIG. 4, read-only memory ("ROM") 405 is connected to system bus 402 and includes a basic input/output system ("BIOS") that controls certain basic functions of infographics generator 102. Random access memory ("RAM") 406 and disk adapter 407 are also connected to system bus 402. It should be noted that software components including operating system 403 and application 404 may be loaded into RAM 406, which may be infographics generator 102 main memory for execution. Disk adapter 407 may be an integrated drive electronics ("IDE") adapter that communicates with a disk unit 408, e.g., disk drive. It is noted that the program for automatically drawing infographics based on data models associated with the selected variables of the dataset, as discussed further below in connection with FIGS. 5-11, 12A-12B and 13-15, may reside in disk unit 408 or in application 404.

Infographics generator 102 may further include a communications adapter 409 connected to bus 402. Communications adapter 409 interconnects bus 402 with an outside network (e.g., network 103 of FIG. 1) to communicate with other devices, such as computing device 101 (FIG. 1).

In one embodiment, application 404 of infographics generator 102 includes the software components of data model engine 301, level of measurement assigner 302, role assigner 303, drawing engine 304 and cluster engine 305. In one embodiment, such components may be implemented in hardware, where such hardware components would be connected to bus 402. The functions discussed above performed by such components are not generic computer functions. As a result, infographics generator 102 is a particular machine that is the result of implementing specific, non-generic computer functions.

In one embodiment, the functionality of such software components (e.g., data model engine 301, level of measurement assigner 302, role assigner 303, drawing engine 304 and cluster engine 305) of infographics generator 102, including the functionality for automatically drawing infographics based on data models associated with the selected variables of the dataset, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, statistical visualization tools are utilized by users to visualize data, such as statistical data, in order to obtain a clear opinion based on the data analysis. Such tools enable users to communicate information clearly and efficiently via statistical graphs, plots and information graphics. Visualization helps users analyze and reason about data using dots, lines, bars, etc. and makes complex data more accessible, understandable and usable. Traditionally, users have to decide which particular infographic (e.g., chart) to use to visualize the dataset being analyzed by the user. "Infographics," as used herein, refer to a visual image, such as a chart or diagram, used to represent information or data. Unfortunately, the user may not have experience or knowledge as to which particular infographic is the best to be utilized to visualize the dataset in order for the user to clearly understand and analyze the dataset. As a result, data applications (e.g., Microsoft® Excel® 365) may attempt to assist the user by suggesting an infographic (e.g., chart) to use to visualize the dataset to be analyzed by the user. Such a suggestion may simply be based on the variables selected by the user to be visualized. However, by simply relying on the selected variables, such as the names of the selected variables, the suggested infographic often does not effectively visualize the dataset in a manner that allows the user to clearly understand and analyze the dataset. Furthermore, in cases in which the user selects continuous variables (numeric variables that have an infinite number of values between any two values), applications may attempt to assist the user by drawing a scatter plot of such continuous variables to display their relationships. Unfortunately, such scatter plots display numerous relationships which may not be relevant thereby causing confusion and frustration for the user. As a result, there is not currently a means for automatically drawing infographics, such as based on variables selected by the user from a dataset, in a manner that allows the user to clearly understand and analyze the dataset.

Figure 5:
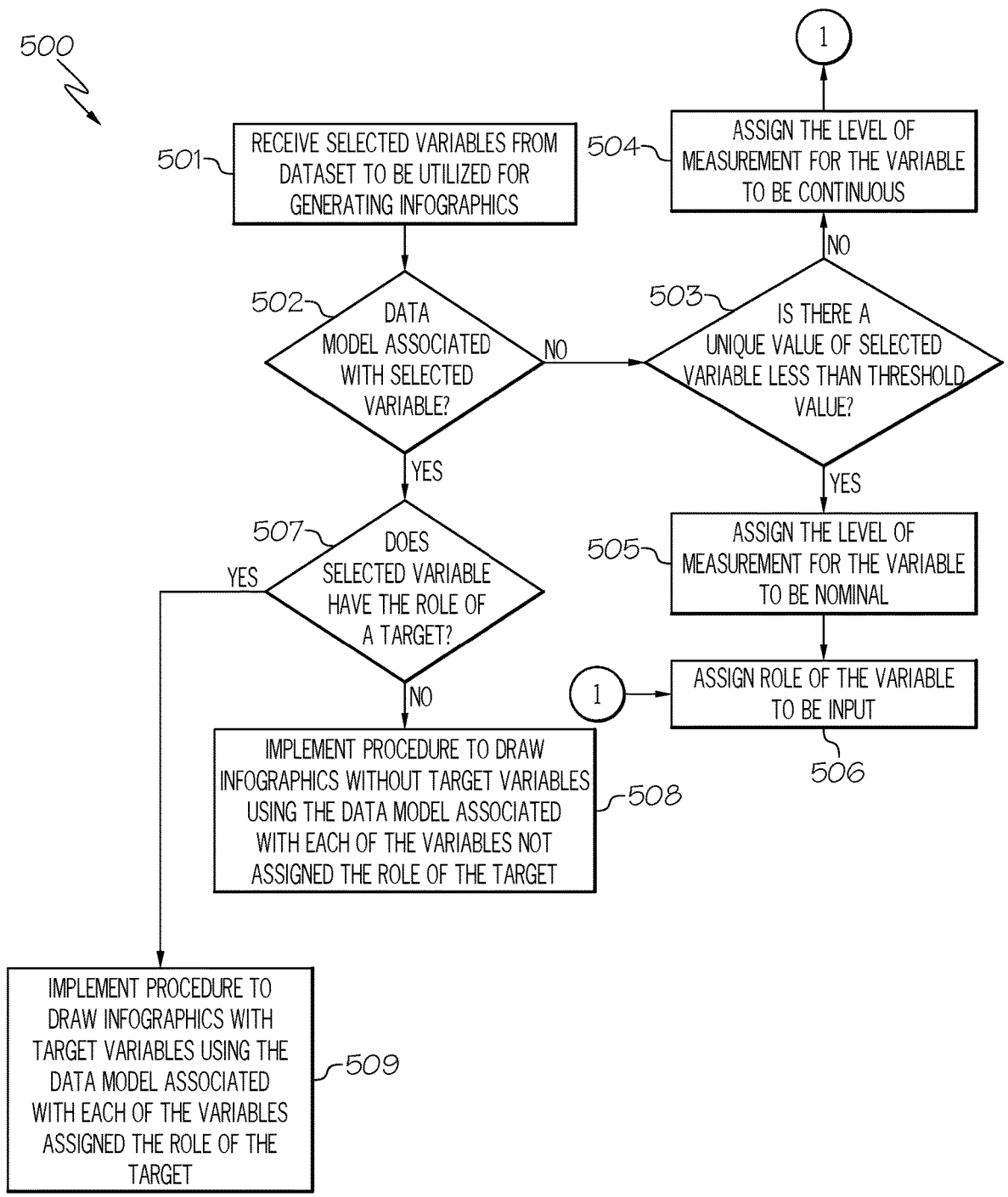
FIG. 5 is a flowchart of a method for automatically drawing infographics based on a data model associated with the selected variables of the dataset in accordance with an embodiment of the present disclosure.
Figure 6:
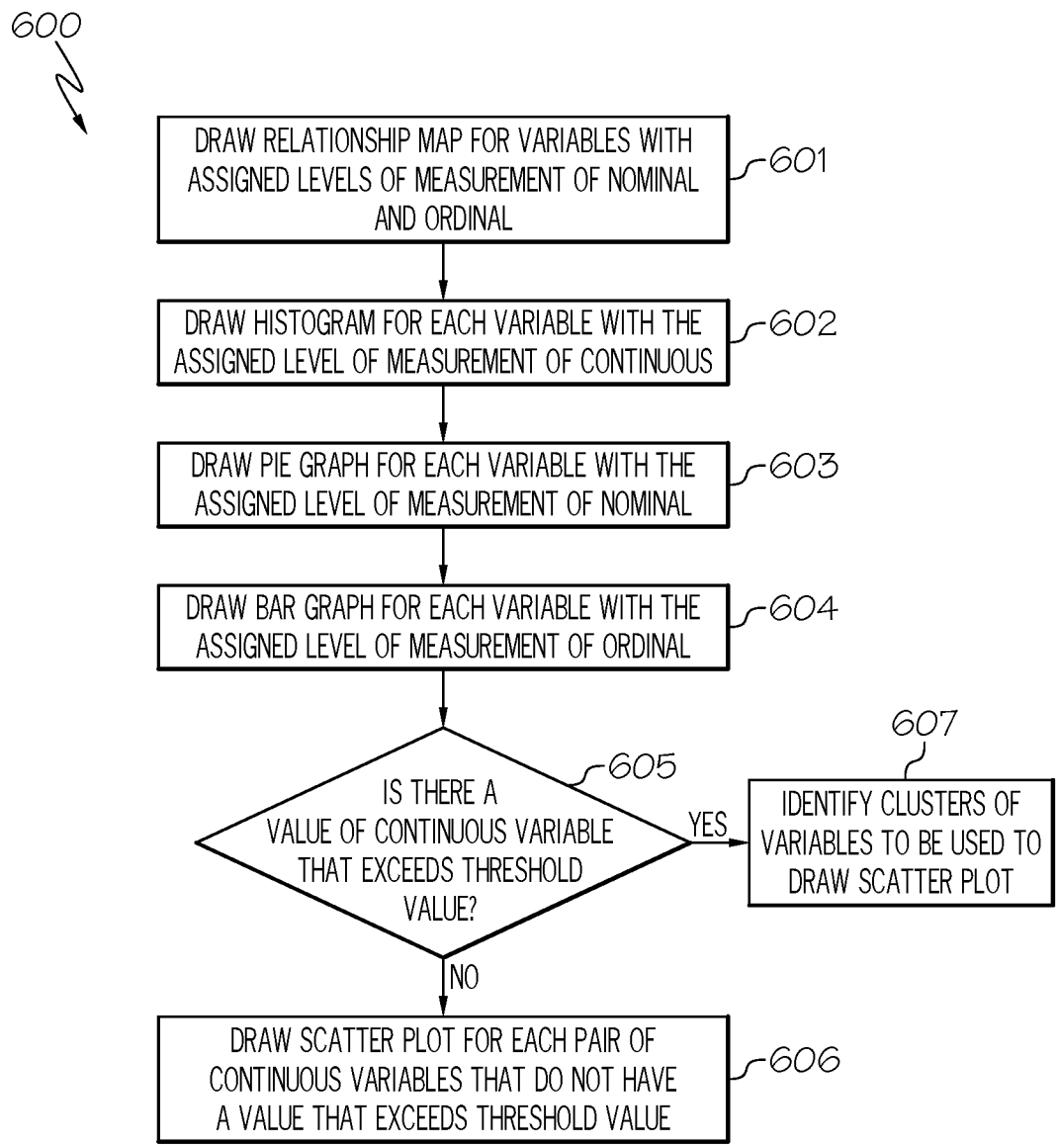
FIG. 6 is a flowchart of a method for implementing the procedure for drawing infographics without the target variables using the data model of the variables in accordance with an embodiment of the present disclosure.
Figure 7:
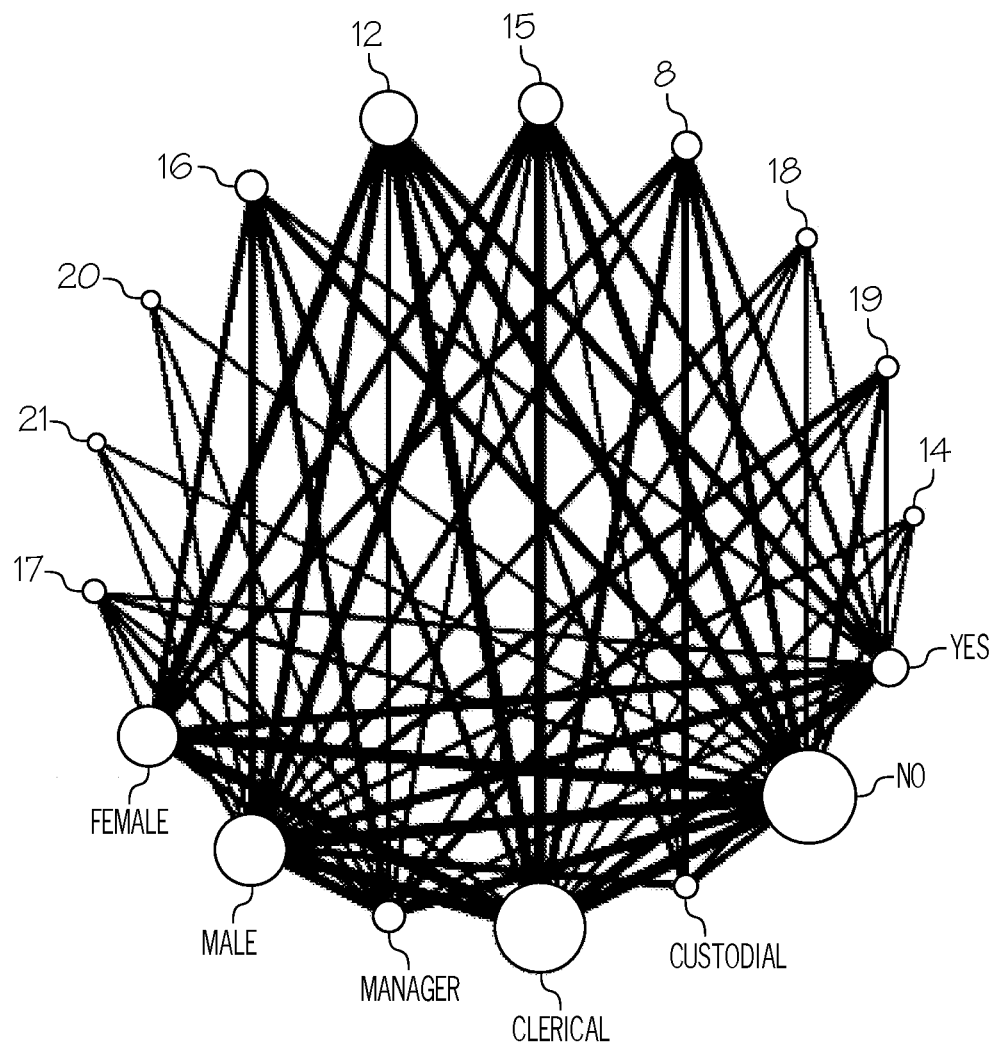
FIG. 7 illustrates an exemplary relationship map that depicts statistical information for variables with the assigned levels of measurement of nominal and ordinal in accordance with an embodiment of the present disclosure.
Figure 8:
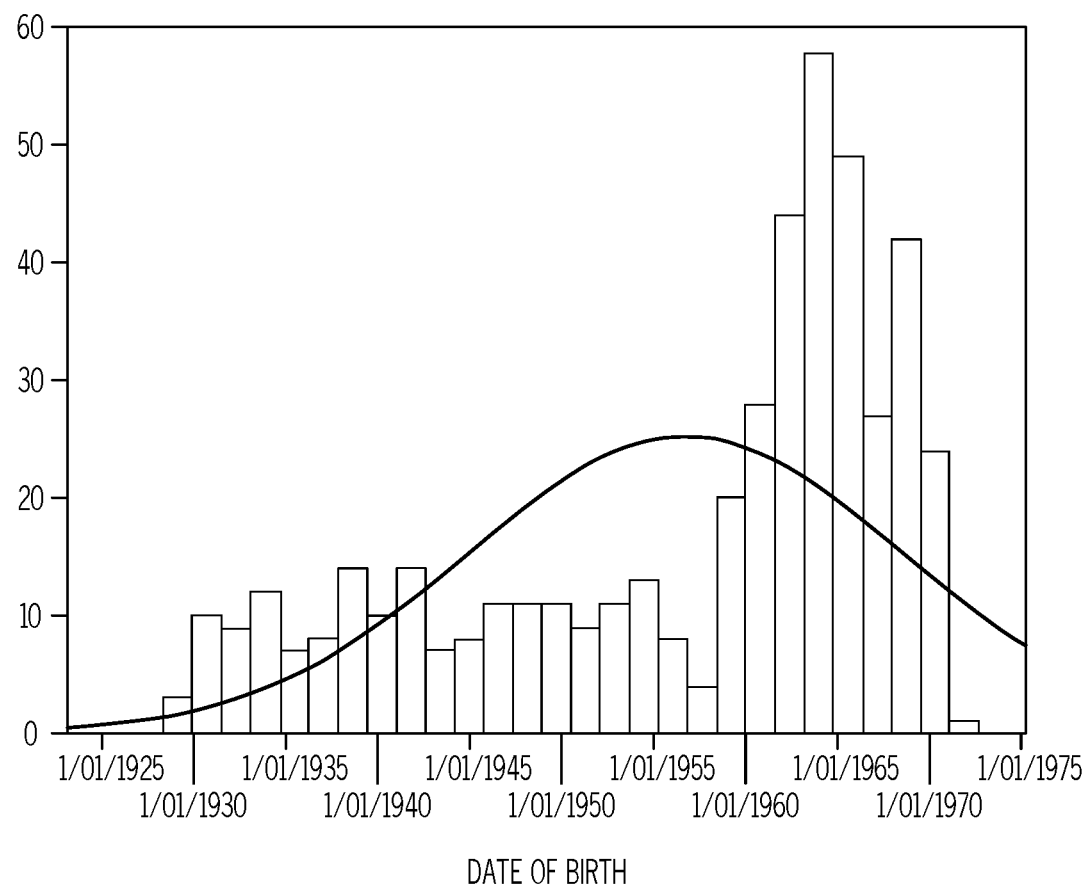
FIG. 8 illustrates an exemplary histogram that depicts statistical information for each variable with the assigned level of measurement of continuous in accordance with an embodiment of the present disclosure.
Figure 9:
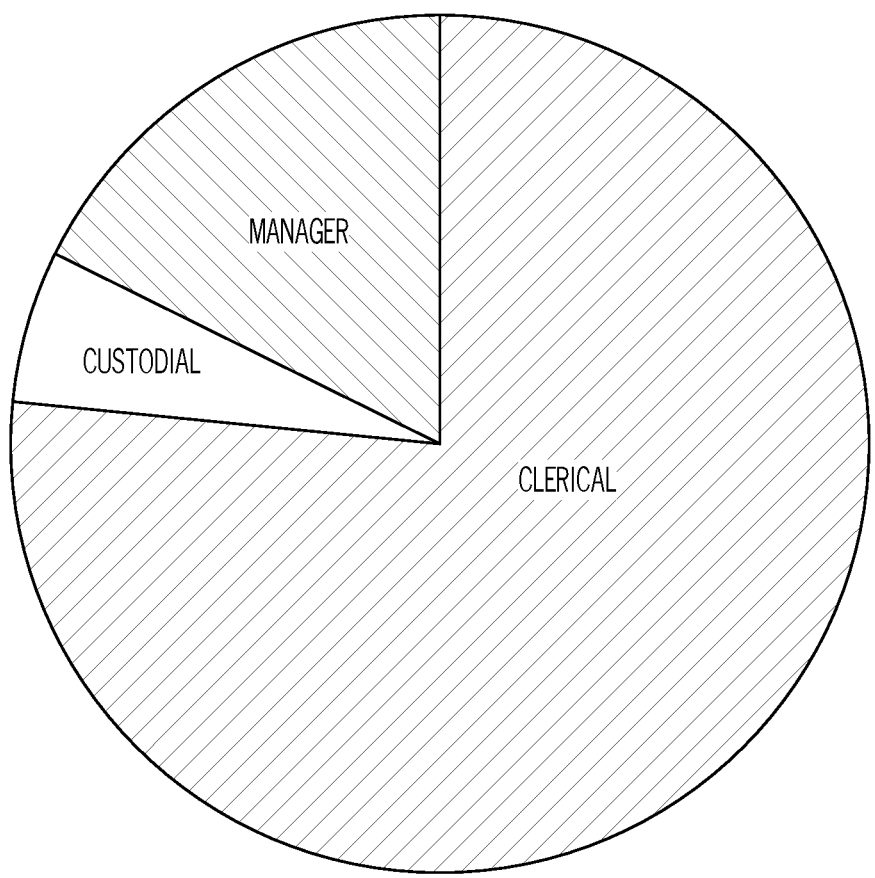
FIG. 9 illustrates an exemplary pie graph that depicts statistical information for each variable with the assigned level of measurement of nominal in accordance with an embodiment of the present disclosure.
Figure 10:
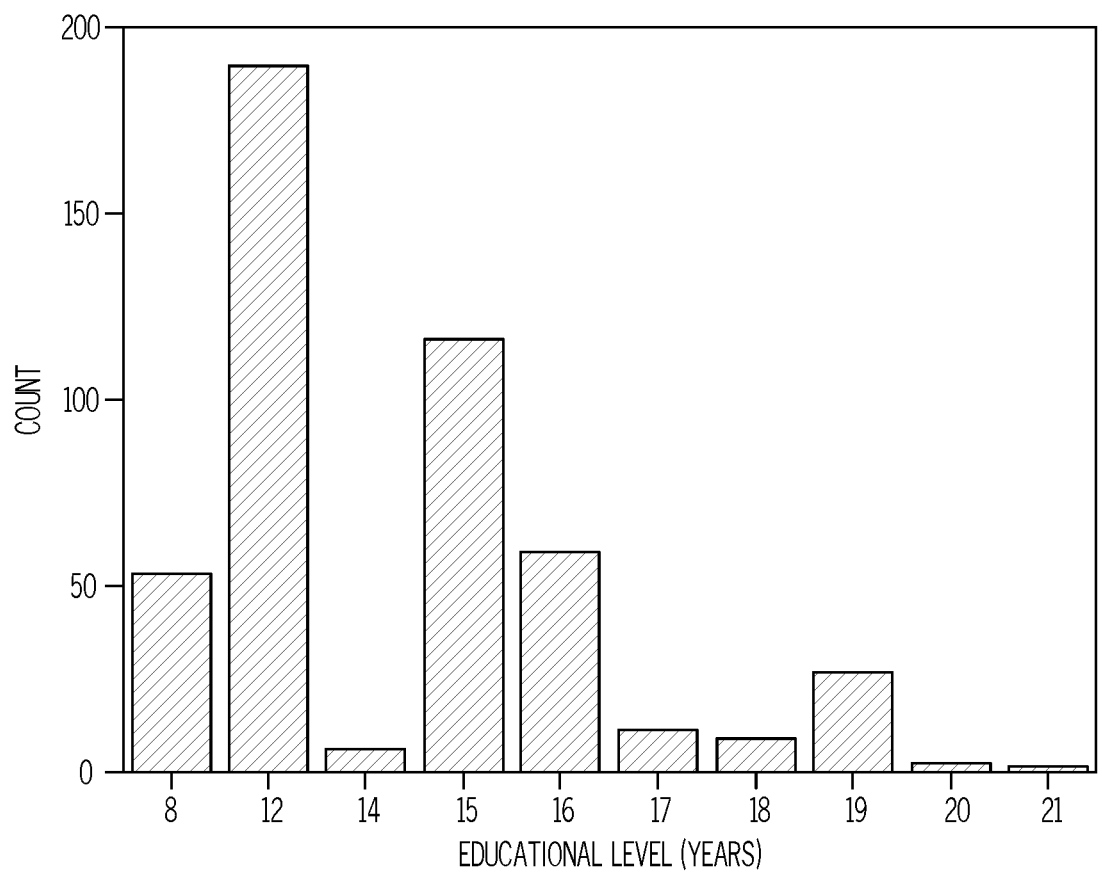
FIG. 10 illustrates an exemplary bar graph that depicts statistical information for each variable with the assigned level of measurement of ordinal in accordance with an embodiment of the present disclosure.
Figure 11:
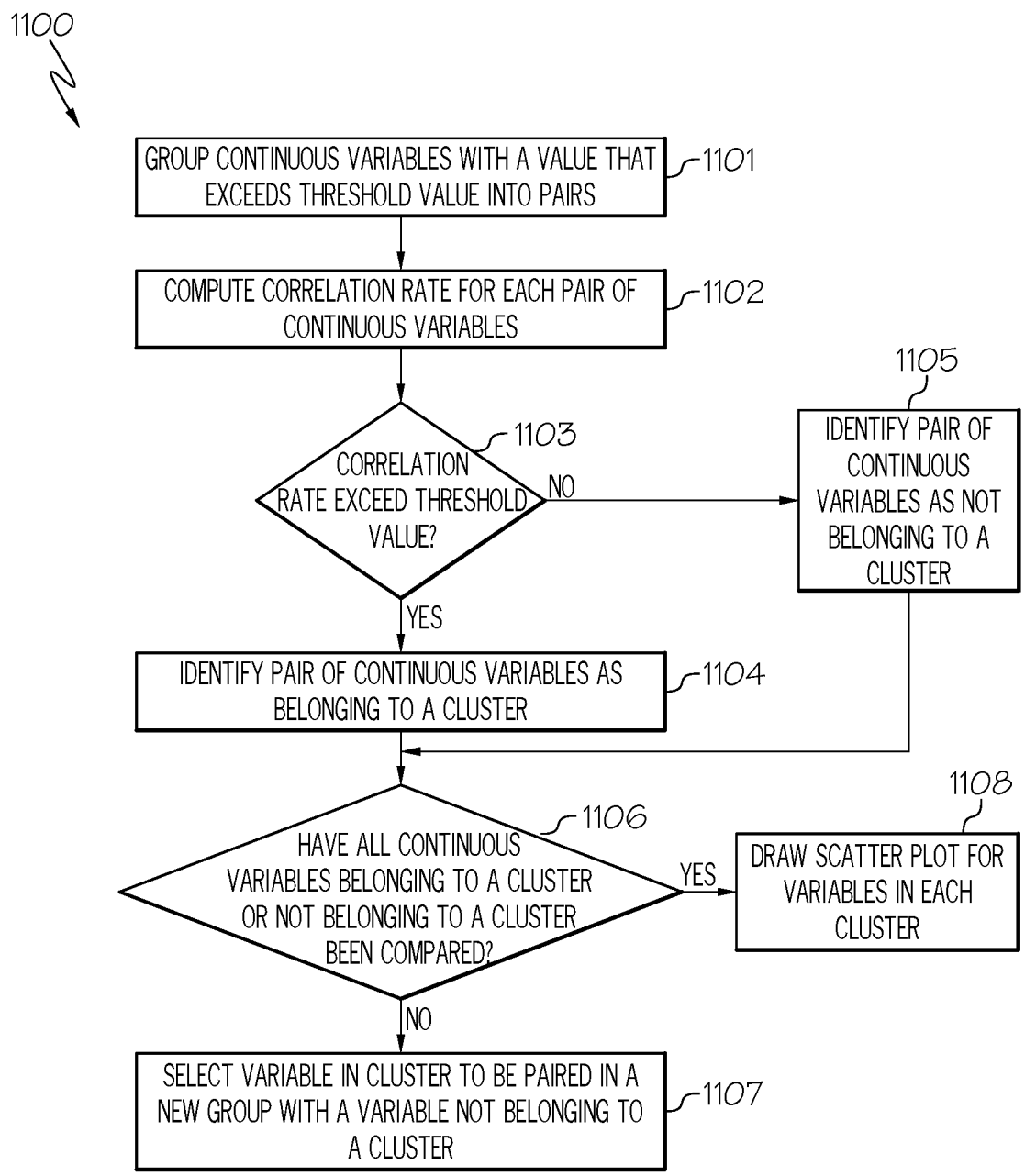
FIG. 11 is a flowchart of a method for identifying clusters of variables to be used to draw a scatter plot in accordance with an embodiment of the present disclosure.
Figure 12A:
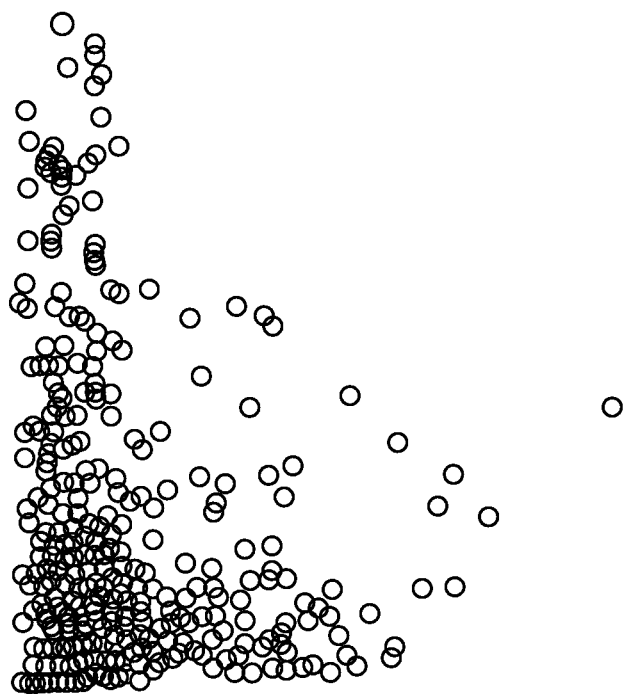
FIGS. 12A-12B illustrate scatter plots that depict statistical information for the variables in each cluster in accordance with an embodiment of the present disclosure.
Figure 12B:
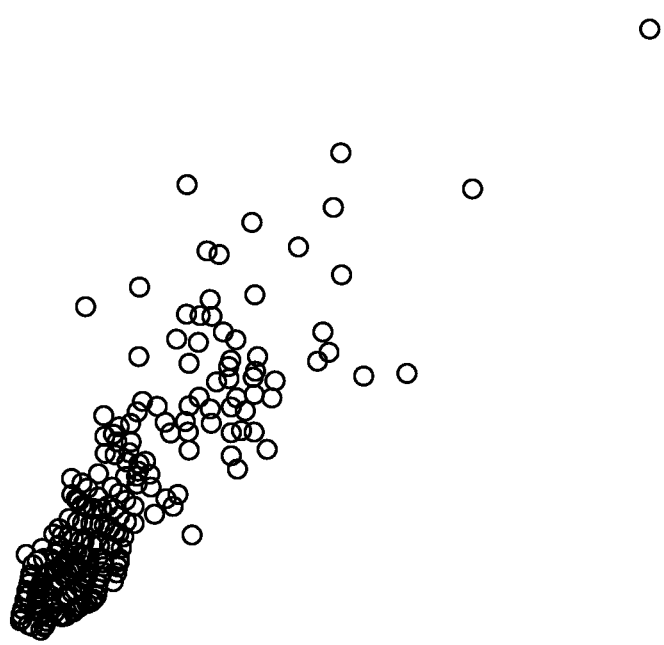
Figure 13:
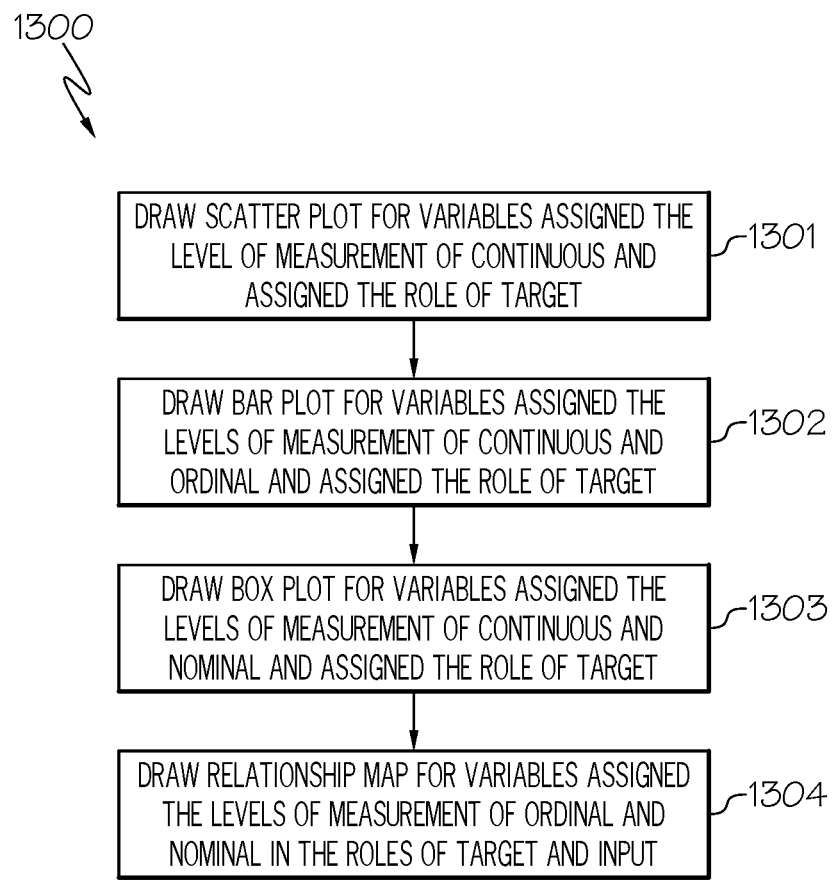
FIG. 13 is a flowchart of a method for implementing the procedure for drawing infographics with variables assigned the role of a target using the data model of the variables in accordance with an embodiment of the present disclosure.
Figure 14:
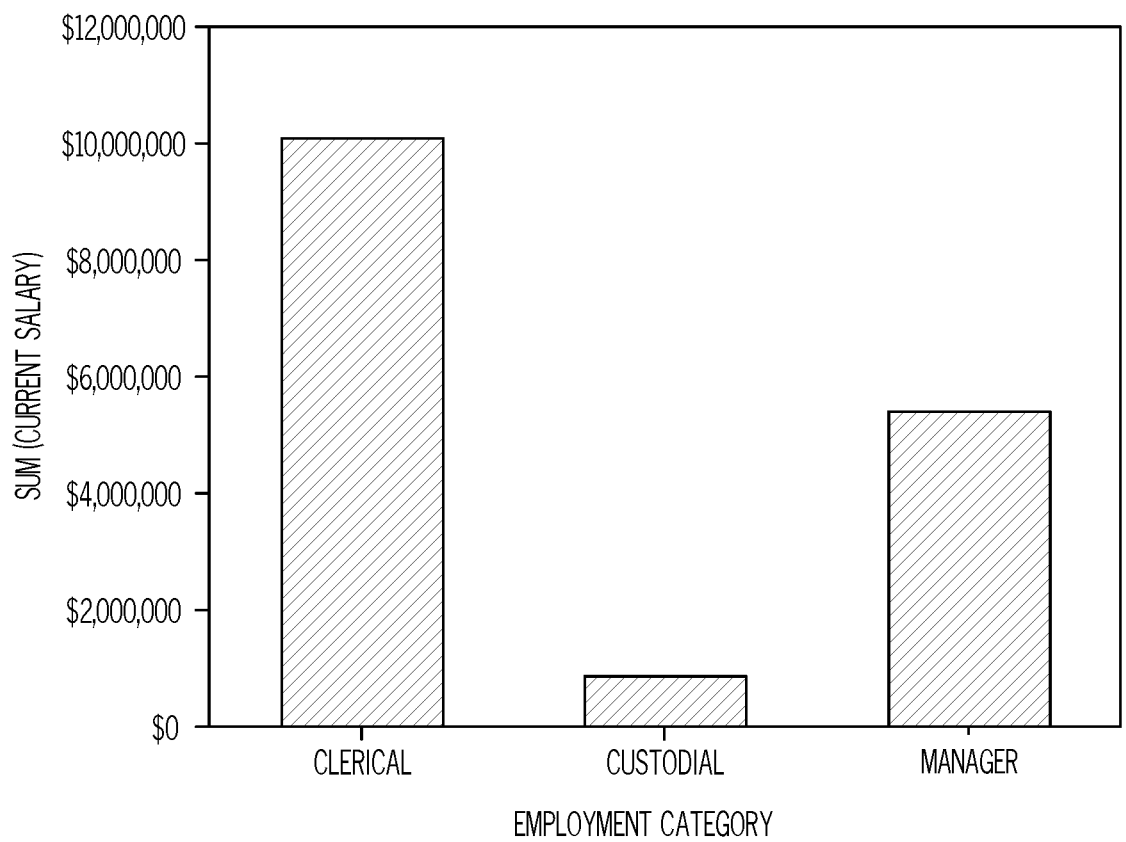
FIG. 14 illustrates an exemplary bar plot that depicts statistical information for variables assigned the level of measurement of continuous and ordinal and assigned the role of target in accordance with an embodiment of the present disclosure.
Figure 15:
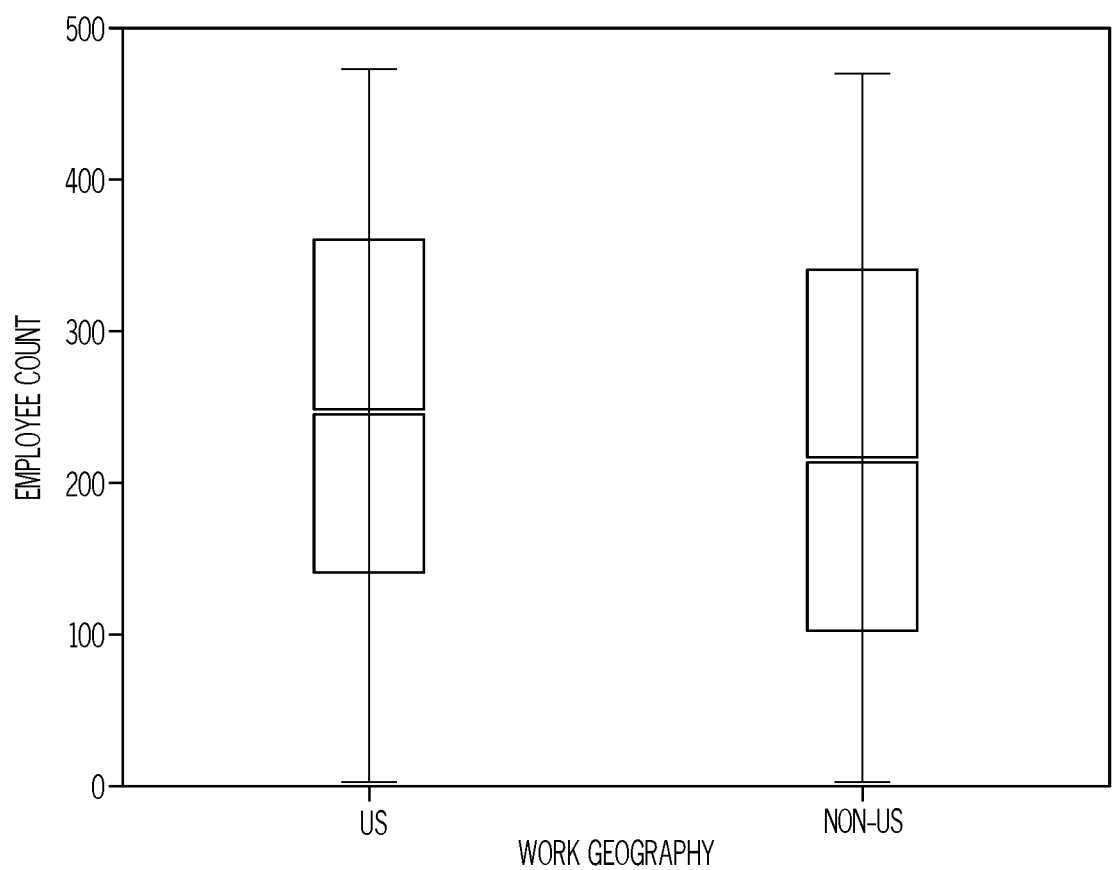
FIG. 15 illustrates an exemplary box plot that depicts statistical information for variables assigned the level of measurement of continuous and nominal and assigned the role of target in accordance with an embodiment of the present disclosure.

The embodiments of the present disclosure provide a means for automatically drawing infographics based on data models associated with the selected variables of the dataset in a manner that allows the user to clearly understand and analyze the dataset as discussed below in connection with FIGS. 5-11, 12A-12B and 13-15. FIG. 5 is a flowchart of a method for automatically drawing infographics based on a data model associated with the selected variables of the dataset. FIG. 6 is a flowchart of a method for implementing the procedure for drawing infographics without the target variables using the data model of the variables. FIG. 7 illustrates an exemplary relationship map that depicts statistical information for variables with the assigned levels of measurement of nominal and ordinal. FIG. 8 illustrates an exemplary histogram that depicts statistical information for each variable with the assigned level of measurement of continuous. FIG. 9 illustrates an exemplary pie graph that depicts statistical information for each variable with the assigned level of measurement of nominal. FIG. 10 illustrates an exemplary bar graph that depicts statistical information for each variable with the assigned level of measurement of ordinal. FIG. 11 is a flowchart of a method for identifying clusters of variables to be used to draw a scatter plot. FIGS. 12A-12B illustrate scatter plots that depict statistical information for the variables in each cluster. FIG. 13 is a flowchart of a method for implementing the procedure for drawing infographics with variables assigned the role of a target using the data model of the variables. FIG. 14 illustrates an exemplary bar plot that depicts statistical information for variables assigned the level of measurement of continuous and ordinal and assigned the role of target. FIG. 15 illustrates an exemplary box plot that depicts statistical information for variables assigned the level of measurement of continuous and nominal and assigned the role of target.

As stated above, FIG. 5 is a flowchart of a method 500 for automatically drawing infographics based on a data model associated with the selected variables of the dataset in accordance with an embodiment of the present disclosure.

Referring to FIG. 5, in conjunction with FIGS. 1-4, in operation 501, infographics generator 102 receives variables of a dataset from computing device 101 that were selected by a user of computing device 101 that are utilized for generating infographics.

In operation 502, for each of the variables of the dataset selected by the user, data model engine 301 of infographics generator 102 determines whether a data model is associated with the selected variable.

As discussed above, in one embodiment, database 104 is populated with variables and associated data models. As discussed above, a "variable," as used herein, refers to a symbol and placeholder for an expression or quantity that varies as an arbitrary or intermediate object. It may represent a number, vector, matrix, function, argument, etc. of a function, set or element of a set. A "data model," as used herein, refers to an abstract model that organizes elements of data and standardizes how they relate to one another and to the properties of real-world entities. For example, a data model may specify that the data element representing a car be composed of a number of other elements which, in turn, represent the color and size of the car and define its owner. In one embodiment, the data model of the present disclosure includes classifications of the variables used in datasets, such as the type of variable, the role of the variable, the level of measurement of the variable, etc. In one embodiment, such variables and associated data models are populated in database 104 by an expert. In one embodiment, such data models are represented as records in database 104 and identified based on the name of the variable, (identifier of the variable in syntax), which is included in the record. In one embodiment, data model engine 301 is configured to identify the relevant record based on matching the name of the variable selected by the user with the variable identified in the record stored in database 104 using natural language processing.

In one embodiment, such variables and associated data models are populated in database 104 by data model engine 301 based on previous assignments of the level of measurements and roles to the variables as discussed further below. In one embodiment, such assignments correspond to the data model for such variables, which may be represented as records in database 104 and identified based on the name of the associated variable.

In one embodiment, data model engine 301 is configured to extract the relevant statistical information about the variable from the data model for those variables with an associated data model, such as by extracting the level of measurement and role of the variable. As discussed above, in one embodiment, data model engine 301 identifies the appropriate data model stored in database 104 based on matching the name of the variable selected by the user with the name of the variable listed in the data model, which may be represented as a record in database 104, using natural language processing.

Data model engine 301 is configured to perform the functions discussed above, such as determining if a data model is associated with a user-selected variable and extracting relevant statistical information about the variable from the data model, using various software tools, including, but not limited to, IBM® SPSS®, GraphPad Prism®, Minitab®, NVivo®, etc.

As previously discussed, data model engine 301 determines if a data model is associated with a user-selected variable, such as a user-selected variable received from computing device 101. If there is not a data model associated with the user-selected variable, then statistical aspects of the variable, such as the level of measurement and role of the variable, are assigned to the variable, which may later be stored in database 104 as a record (record for a data model) associated with the variable for later utilization. In such a record of the data model, the record may include an identification of the variable, such as a name, to be associated with the variable thereby allowing it to be discoverable by data model engine 301 as discussed above.

If there is not a data model associated with a user-selected variable, then, in operation 503, data model engine 301 of infographics generator 102 determines whether there is a unique value of the selected variable that is less than a threshold value, which may be user-selected.

If there is not a unique value of the selected variable that is less than the threshold value, then, in operation 504, level of measurement assigner 302 of infographics generator 102 assigns the level of measurement for the variable to be continuous.

As discussed above, a "level of measurement," as used herein, refers to how precisely the variable is recorded. In one embodiment, there are three different levels of measurement, namely, nominal, ordinal and continuous (which includes what may be referred to as "interval" and "ratio"). In a "nominal" level of measurement, the number in the variable is used only to classify the data. In this level of measurement, words, letters and alpha-numeric symbols can be used. In the "ordinal" level of measurement, the ordered relationship among the variable's observations are depicted. For example, suppose a student scores the highest grade of 100 in the class. In this case, the student would be assigned the first rank. Then, another classmate scores the second highest grade of a 92. This student would be assigned the second rank and so forth. A "continuous" level of measurement includes both the interval and ratio levels of measurements. The interval level of measurement not only classifies and orders the measurements, but it also specifies that the distances between each interval on the scale are equivalent along the scale from low interval to high interval. For example, an interval level of measurement could be the measurement of temperature change, where, for example, the distance between 20° C. and 22° C. is the same as the distance between 26° C. ad 28° C. In the ratio level of measurement, the observations, in addition to having equal intervals, can have a value of zero as well. In the ratio level of measurement, the divisions between the points on the scale have an equivalent distance between them.

Level of measurement assigner 302 is configured to perform the assignment of the level of measurement for the variable to be continuous using various software tools, including, but not limited to, IBM® SPSS®, GraphPad Prism®, RStudio®, Stata®, Minitab®, JMP®, G*Power®, OriginPro®, etc.

Returning to operation 503, if, however, there is a unique value of the selected variable that is less than the threshold value, then, in operation 505, level of measurement assigner 302 assigns the level of measurement for the variable to be nominal.

As stated above, level of measurement assigner 302 is configured to perform the assignment of the level of measurement for the variable to be nominal using various software tools, including, but not limited to, IBM® SPSS®, GraphPad Prism®, RStudio®, Stata®, Minitab®, JMP®, G*Power®, OriginPro®, etc.

Upon assigning the level of measurement for the variable to be continuous in operation 504 or upon assigning the level of measurement for the variable to be nominal in operation 505, in operation 506, role assigner 303 of infographics generator 102 assigns a role for the variable not associated with a data model to be input. As discussed above, the "role of the variable," as used herein, refers to the use of the variable in the analysis.

By assigning the level of measurement and a role to the variables not originally associated with a data model, such statistical information forms a data model for such variables. As a result, such variables now effectively have a data model associated with them. Furthermore, in one embodiment, such data models may include other statistical information, such as the names of such variables.

In one embodiment, role assigner 303 assigns, by default, the role of the variable not associated with the data model to be input. In one embodiment, the default action performed by role assigner 303 is not to be limited in scope to assigning the role of input but may include a different role as determined by an expert.

Role assigner 303 is configured to perform the function of assigning a role for the variable, using various software tools, including, but not limited to, IBM® SPSS®, GraphPad Prism®, RStudio®, Stata®, Minitab®, JMP®, G*Power®, OriginPro®, etc.

Returning to operation 502, if, however, there is a data model associated with the selected variable, then, in operation 507, data model engine 301 of infographics generator 102 determines whether the selected variable has the role of a target.

As previously discussed, data model engine 301 is configured to extract the relevant statistical information about the variable from the data model for those variables with an associated data model, such as by extracting the level of measurement and role of the variable. In one embodiment, data model engine 301 identifies the appropriate data model stored in database 104 based on matching the name of the variable selected by the user with the name of the variable listed in the data model, which may be represented as a record in database 104, using natural language processing.

If data model engine 301 determines that the selected variable has not been assigned the role of a target, or upon assigning the role of the variable to be input for those user-selected variables that were not originally associated with a data model, then, in operation 508, drawing engine 304 of infographics generator 102 implements the procedure to draw infographics without the target variables using the data model associated with each of the variables not assigned the role of the target as discussed in further detail below in connection with FIG. 6.

FIG. 6 is a flowchart of a method 600 for implementing the procedure for drawing infographics without the target variables using the data model of the variables in accordance with an embodiment of the present disclosure.

Referring to FIG. 6, in conjunction with FIGS. 1-5, in operation 601, drawing engine 304 of infographics generator 102 draws a relationship map for variables with the assigned levels of measurement of nominal and ordinal as illustrated in FIG. 7. FIG. 7 illustrates an exemplary relationship map that depicts statistical information for variables with the assigned levels of measurement of nominal and ordinal in accordance with an embodiment of the present disclosure.

Returning to FIG. 6, in conjunction with FIGS. 1-5, in operation 602, drawing engine 304 of infographics generator 102 draws a histogram for each variable with the assigned level of measurement of continuous as illustrated in FIG. 8. FIG. 8 illustrates an exemplary histogram that depicts statistical information for each variable with the assigned level of measurement of continuous in accordance with an embodiment of the present disclosure.

Returning again to FIG. 6, in conjunction with FIGS. 1-5, in operation 603, drawing engine 304 of infographics generator 102 draws a pie graph for each variable with the assigned level of measurement of nominal as illustrated in FIG. 9. FIG. 9 illustrates an exemplary pie graph that depicts statistical information for each variable with the assigned level of measurement of nominal in accordance with an embodiment of the present disclosure.

Returning once again to FIG. 6, in conjunction with FIGS. 1-5, in operation 604, drawing engine 304 of infographics generator 102 draws a bar graph for each variable with the assigned level of measurement of ordinal as illustrated in FIG. 10. FIG. 10 illustrates an exemplary bar graph that depicts statistical information for each variable with the assigned level of measurement of ordinal in accordance with an embodiment of the present disclosure.

As discussed above, in one embodiment, drawing engine 304 utilizes metadata (e.g., values of the variable), which is obtained by parsing the original data (original dataset), to draw the infographics discussed herein (e.g., histogphy, pie graph, bar graph, scatter plot). In one embodiment, such metadata includes structured information describing the parameter, including dates, title, creators, etc. in addition to the values of the parameter. In one embodiment, such metadata is stored within the dataset. In one embodiment, such metadata is stored in a database, such as a data dictionary or metadata repository. In one embodiment, such metadata associated with the dataset is parsed by drawing engine 304 to obtain the information discussed above using a metadata parser, such as mp from DataONE. In one embodiment, such metadata is extracted using various software tools, including, but not limited to, Alation®, Collibra®, Erwin®, IBM® InfoSphere®, Infogix®, Informatica®, Octopai, OvalEdge®, etc.

Returning to FIG. 6, in conjunction with FIGS. 1-5, in operation 605, cluster engine 305 of infographic generator 102 determines if there is a value of a continuous variable that exceeds a threshold value, which may be user-selected.

If there not a value of a continuous variable that exceeds the threshold value, then, in operation 606, drawing engine 34 of infographics generator 102 draws a scatter plot for each pair of continuous variables that do not have a value that exceeds the threshold value.

If, however, there is a value of a continuous variable that exceeds the threshold value, then, in operation 607, for those continuous variables with a value that exceeds the threshold value, cluster engine 305 of infographics generator 102 identifies the clusters of variables to be used by drawing engine 304 to draw a scatter plot as discussed below in connection with FIG. 11. Such a process may be referred to herein as the "pair-group search strategy."

FIG. 11 is a flowchart of a method 1100 for identifying clusters of variables to be used to draw a scatter plot in accordance with an embodiment of the present disclosure.

Referring to FIG. 11, in conjunction with FIGS. 1-6, in operation 1101, cluster engine 305 of infographics generator 102 groups the continuous variables with a value that exceeds the threshold value (threshold value discussed above in connection with operation 605 of FIG. 6), which may be user-selected, into pairs.

As stated above, for example, suppose the variables A, B, C, D, E and F are continuous variables with a value that exceeds the threshold value. Cluster engine 305 may then group such variables into the following pairs: (A, B), (C, D), (E, F).

In operation 1102, cluster engine 305 of infographics generator 102 computes the correlation rate for each pair of continuous variables.

As discussed above, the "correlation rate," as said herein, refers to a measure of how strong a relationship is between two variables. In one embodiment, such correlation rates may be determined by computing the Euclidean distance or cosine distance between such variables. The Euclidean distance refers to the distance between two points in Euclidean space, which corresponds to the length of a line segment between the two points, such as the points of two variables. Cosine distance is a measure of similarity between two non-zero vectors of the variables of an inner product space. Cosine distance is equal to the cosine of the angle between them, which is also the same as the inner product of the same vectors normalized to both have length 1.

In operation 1103, cluster engine 305 of infographics generator 102 determines if the correlation relate exceeds a threshold value, which may be user-selected.

If the computed correlation rate exceeds the threshold value, then, in operation 1104, cluster engine 305 of infographics generator 012 has identified a pair of continuous variables as belonging to a cluster.

If, however, the computed correlation rate does not exceed the threshold value, then, in operation 1105, cluster engine 305 of infographics generator 102 has identified a pair of continuous variables as not belonging to a cluster.

For instance, referring to the above example, after comparing the correlation rate for each pair of continuous variables with the threshold value, variable pairs [A, B] and [E, F] may be deemed to be groups of clusters, whereas, variables C, D may be deemed to not belong to a cluster.

Upon identifying a pair of continuous variables as belonging or not belonging to a cluster, in operation 1106, cluster engine 305 of infographics generator 102 determines if all the continuous variables belonging to a cluster or not belonging to a cluster have been compared.

If not all the continuous variables belonging to a cluster or not belonging to a cluster have been compared, then, in operation 1107, cluster engine 305 of infographics generator 102 selects a variable in a cluster to be paired in a new group with a variable not belonging to a cluster.

For instance, referring to the above example, new groups of variable pairs may consist of (A, C) and (D, E). Cluster engine 305 may then compute the correlation rate for each pair of continuous variables in each of these new groups as discussed above. If the correlation rate is greater than the threshold value, which may be user-specified, then such variables are in the same cluster. Otherwise, they are deemed to not belong to a cluster. For instance, referring to the above example, after comparing the correlation rate for each pair of continuous variables in each of these new groups, variable pairs [A, B, C] and [E, F] may be deemed to be groups of clusters, whereas, variable D may be deemed to not belong to a cluster.

The above process continues until all the continuous variables belonging to a cluster or not belonging to a cluster have been compared.

Referring to operation 1106, if all the continuous variables belonging to a cluster and not belonging to a cluster have been compared, then, in operation 1108, cluster engine 305 requests drawing engine 304 of infographics generator 102 to draw a scatter plot for the variables in each cluster, which, in turn, draws the scatter plot for the variables in each cluster as shown in FIGS. 12A-12B. FIGS. 12A-12B illustrate scatter plots that depict statistical information for the variables in each cluster in accordance with an embodiment of the present disclosure.

For instance, referring to the above example, drawing engine 304 draws a scatter plot for clusters (A, B), (A, C), (B, C) and (E, F). By utilizing the pair-group search strategy, the complexity of correlation analysis and in selecting the appropriate continuous variables to be drawn, such as in a scatter plot, are greatly reduced thereby improving the clarity and understandability of the infographics, such as a scatter plot.

Cluster engine 305 is configured to perform the functions discussed above, using various software tools, including, but not limited to, ArcGis® Pro, IBM® SPSS® Modeler, RapidMiner®, Alteryx®, RStudio®, Tableau®, etc.

Referring to operation 507 of FIG. 5, if data model engine 301 determines that the selected variable associated with a data model has been assigned the role of a target, then, in operation 509, drawing engine 304 of infographics generator 102 implements the procedure to draw infographics with variables assigned the role of target using the data model associated with each of the variables assigned the role of the target as discussed in further detail below in connection with FIG. 13.

FIG. 13 is a flowchart of a method 1300 for implementing the procedure for drawing infographics with variables assigned the role of a target using the data model of the variables in accordance with an embodiment of the present disclosure.

Referring to FIG. 13, in conjunction with FIGS. 1-5, in operation 1301, drawing engine 304 of infographics generator 102 draws a scatter plot for variables assigned the level of measurement of continuous and assigned the role of target. An illustration of such a scatter plot is provided in FIGS. 12A-12B.

Returning to FIG. 13, in conjunction with FIGS. 1-5, in operation 1302, drawing engine 304 of infographics generator 102 draws a bar plot for variables assigned the levels of measurement of continuous and ordinal and assigned the role of target as illustrated in FIG. 14. FIG. 14 illustrates an exemplary bar plot that depicts statistical information for variables assigned the level of measurement of continuous and ordinal and assigned the role of target in accordance with an embodiment of the present disclosure.

Returning again to FIG. 13, in conjunction with FIGS. 1-5, in operation 1303, drawing engine 304 of infographics generator 102 draws a box plot for variables assigned the levels of measurement of continuous and nominal and assigned the role of target as illustrated in FIG. 15. FIG. 15 illustrates an exemplary box plot that depicts statistical information for variables assigned the level of measurement of continuous and nominal and assigned the role of target in accordance with an embodiment of the present disclosure.

Returning once again to FIG. 13, in conjunction with FIGS. 1-5, in operation 1304, drawing engine 304 of infographics generator 102 draws a relationship map for variables assigned the levels of measurement of ordinal and nominal in the roles of target and input. An illustration of such a relationship map is provided in FIG. 7.

As discussed above, in one embodiment, drawing engine 304 utilizes metadata (e.g., values of the variable), which is obtained by parsing the original data (original dataset), to draw the infographics discussed herein (e.g., scatter plot, bar plot, box plot, relationship map). In one embodiment, such metadata includes structured information describing the parameter, including dates, title, creators, etc. in addition to the values of the parameter. In one embodiment, such metadata is stored within the dataset. In one embodiment, such metadata is stored in a database, such as a data dictionary or metadata repository. In one embodiment, such metadata associated with the dataset is parsed by drawing engine 304 to obtain the information discussed above using a metadata parser, such as mp from DataONE. In one embodiment, such metadata is extracted using various software tools, including, but not limited to, Alation®, Collibra®, Erwin®, IBM® InfoSphere®, Infogix®, Informatica®, Octopai, OvalEdge®, etc.

In this manner, the principles of the present disclosure provide the means for automatically drawing infographics, such as based on variables selected by the user from a dataset, in a manner that allows the user to clearly understand and analyze the dataset.

Furthermore, the principles of the present disclosure improve the technology or technical field involving statistical visualization tools.

As discussed above, statistical visualization tools are utilized by users to visualize data, such as statistical data, in order to obtain a clear opinion based on the data analysis. Such tools enable users to communicate information clearly and efficiently via statistical graphs, plots and information graphics. Visualization helps users analyze and reason about data using dots, lines, bars, etc. and makes complex data more accessible, understandable and usable. Traditionally, users have to decide which particular infographic (e.g., chart) to use to visualize the dataset being analyzed by the user. "Infographics," as used herein, refer to a visual image, such as a chart or diagram, used to represent information or data. Unfortunately, the user may not have experience or knowledge as to which particular infographic is the best to be utilized to visualize the dataset in order for the user to clearly understand and analyze the dataset. As a result, data applications (e.g., Microsoft® Excel® 365) may attempt to assist the user by suggesting an infographic (e.g., chart) to use to visualize the dataset to be analyzed by the user. Such a suggestion may simply be based on the variables selected by the user to be visualized. However, by simply relying on the selected variables, such as the names of the selected variables, the suggested infographic often does not effectively visualize the dataset in a manner that allows the user to clearly understand and analyze the dataset. Furthermore, in cases in which the user selects continuous variables (numeric variables that have an infinite number of values between any two values), applications may attempt to assist the user by drawing a scatter plot of such continuous variables to display their relationships. Unfortunately, such scatter plots display numerous relationships which may not be relevant thereby causing confusion and frustration for the user. As a result, there is not currently a means for automatically drawing infographics, such as based on variables selected by the user from a dataset, in a manner that allows the user to clearly understand and analyze the dataset.

Embodiments of the present disclosure improve such technology by receiving variables of a dataset from a computing device that were selected by the user of the computing device. For each of the variables that were selected by the user, a determination is made as to whether a data model is associated with the selected variable. A "variable," as used herein, refers to a symbol and placeholder for an expression or quantity that varies as an arbitrary or intermediate object. It may represent a number, vector, matrix, function, argument, etc. of a function, set or element of a set. A "data model," as used herein, refers to an abstract model that organizes elements of data and standardizes how they relate to one another and to the properties of real-world entities. In one embodiment, the data model includes classifications of the variables used in datasets, such as the type of variable, the role of the variable, the level of measurement of the variable, etc. For those selected variables that are associated with a data model, which may have been previously stored in a database, a determination is made as to whether the variable has been assigned the role of a target. If so, then a procedure to draw infographics for variables assigned the role of a target using the data model associated with each of the variables assigned the role of target is implemented. If, however, the variable has not been assigned the role of a target, then a procedure to draw infographics for variables not assigned the role of a target using the data model associated with each of the variables not assigned the role of target is implemented. In one embodiment, such infographics are drawn using the metadata (e.g., values of the variable) obtained by parsing the original data (original dataset). Alternatively, if the selected variables are not associated with a data model, then such variables are assigned a level of measurement (e.g., continuous, nominal) based on whether there is a value of the selected variable that is less than a threshold value, which may be user-specified, as well as assigned the role of input. Such assignments (assignment of the level of measurement and role) become the data model which, along with the metadata (e.g., values of the variable) obtained by parsing the original data, are used to implement the procedure to draw infographics for variables not assigned the role of a target. In this manner, infographics are automatically drawn based on variables selected by the user from a dataset in a manner that allows the user to clearly understand and analyze the dataset. Furthermore, in this manner, there is an improvement in the technical field involving statistical visualization tools.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for automatically drawing infographics, the method comprising:

populating a database with variables and associated data models based on previous assignments of levels of measurements and roles of variables;

receiving selected variables from a dataset to be utilized for generating infographics from a computing device by an infographics generator;

utilizing said data models stored in said database connected to said infographics generator for classifications of variables used in datasets, wherein said classifications of variables used in datasets comprise a type of variables, a role of variables, and a level of measurement of variables;

identifying an appropriate data model stored in said database based on matching a name of a variable selected by a user with a name of a variable listed in said data model using natural language processing;

parsing, by said infographics generator, said dataset to obtain metadata;

automatically implementing a procedure to draw infographics, by said infographics generator, for variables not assigned a role of a target using said metadata and said data model associated with each of said variables not assigned said role of said target in response to said variables not being assigned said role of said target;

automatically implementing a procedure to draw infographics, by said infographics generator, for variables assigned said role of said target using said metadata and said data model associated with each of said variables assigned said role of said target in response to said variables being assigned said role of said target;

determining if there is a value of a continuous variable that exceeds a first threshold value; and performing a pair-group search strategy to reduce a complexity of correlation analysis and in selecting appropriate continuous variables to be drawn thereby improving clarity and understandability of infographics in response to said value of said continuous variable exceeding said first threshold value, wherein said pair-group search strategy comprises:

grouping continuous variables with a value that exceeds said first threshold value;

computing a correlation rate for each pair of continuous variables by computing a Euclidean distance or a cosine distance between said pair of continuous variables, wherein said correlation rate measures show strong a relationship is between two variables;

identifying a pair of continuous variables as belonging to a same cluster in response to said computed correlation rate exceeding said first threshold value; and identifying a pair of continuous variables as not belonging to said same cluster in response to said computed correlation rate not exceeding said first threshold value.

2. The method as recited in claim 1 further comprising:
determining whether a value for each of said received variables not associated with said data model is less than a second threshold value;
assigning a level of measurement to be continuous for a first variable not associated with said data model without having a value that is less than said second threshold value;
assigning a level of measurement to be nominal for a second variable not associated with said data model having a value that is less than said second threshold value; and
assigning each of said received variables not associated with said data model to have a role of input.

3. The method as recited in claim 1, wherein said procedure to draw infographics for variables not assigned said role of said target comprises one or more of the following selected from the group consisting of: drawing a relationship map for variables with assigned levels of measurement of nominal and ordinal, drawing a histogram for each variables with an assigned level of measurement of continuous, drawing a pie graph for each variable with an assigned level of measurement of nominal, and drawing a bar graph for each variable with an assigned level of measurement of ordinal.

4. The method as recited in claim 1, wherein said procedure to draw infographics for variables not assigned said role of said target comprises identifying clusters of variables to be used to draw a scatter plot in response to said value of continuous variables exceeding said first threshold value.

5. The method as recited in claim 1, comprising:
wherein said data model includes classifications of variables used in datasets, wherein said classifications comprise a type of variable, a role of said variable, and the level of measurement of said variable.

6. The method as recited in claim 1 further comprising:
selecting a variable in said same cluster to be paired in a new group with a variable not belonging to said same cluster in response to not comparing all continuous variables belonging to said same cluster or not belonging to said same cluster.

7. The method as recited in claim 1 further comprising:
forming a data model for variables not previously associated with a data model using a level of measurement and a role assigned to said variables.

8. A computer program product for automatically drawing infographics, the computer program product comprising one or more computer readable storage mediums having program code embodied therewith, the program code comprising programming instructions for:
populating a database with variables and associated data models based on previous assignments of levels of measurements and roles of variables;
receiving selected variables from a dataset to be utilized for generating infographics from a computing device by an infographics generator;
utilizing said data models stored in said database connected to said infographics generator for classifications of variables used in datasets, wherein said classifications of variables used in datasets comprise a type of variables, a role of variables, and a level of measurement of variables;
identifying an appropriate data model stored in said database based on matching a name of a variable selected by a user with a name of a variable listed in said data model using natural language processing;
parsing, by said infographics generator, said dataset to obtain metadata;
automatically implementing a procedure to draw infographics, by said infographics generator, for variables not assigned a role of a target using said metadata and said data model associated with each of said variables not assigned said role of said target in response to said variables not being assigned said role of said target;
automatically implementing a procedure to draw infographics, by said infographics generator, for variables assigned said role of said target using said metadata and said data model associated with each of said variables assigned said role of said target in response to said variables being assigned said role of said target;
determining if there is a value of a continuous variable that exceeds a first threshold value; and
performing a pair-group search strategy to reduce a complexity of correlation analysis and in selecting appropriate continuous variables to be drawn thereby improving clarity and understandability of infographics in response to said value of said continuous variable exceeding said first threshold value, wherein said pair-group search strategy comprises:
grouping continuous variables with a value that exceeds said first threshold value;
computing a correlation rate for each pair of continuous variables by computing a Euclidean distance or a cosine distance between said pair of continuous variables, wherein said correlation rate measures show strong a relationship is between two variables;
identifying a pair of continuous variables as belonging to a same cluster in response to said computed correlation rate exceeding said first threshold value; and
identifying a pair of continuous variables as not belonging to said same cluster in response to said computed correlation rate not exceeding said first threshold value.

9. The computer program product as recited in claim 8, wherein the program code further comprises the programming instructions for:
determining whether a value for each of said received variables not associated with said data model is less than a second threshold value;
assigning a level of measurement to be continuous for a first variable not associated with said data model without having a value that is less than said second threshold value;
assigning a level of measurement to be nominal for a second variable not associated with said data model having a value that is less than said second threshold value; and
assigning each of said received variables not associated with said data model to have a role of input.

10. The computer program product as recited in claim 8, wherein said procedure to draw infographics for variables not assigned said role of said target comprises one or more of the following selected from the group consisting of: drawing a relationship map for variables with assigned levels of measurement of nominal and ordinal, drawing a histogram for each variables with an assigned level of measurement of continuous, drawing a pie graph for each variable with an assigned level of measurement of nominal, and drawing a bar graph for each variable with an assigned level of measurement of ordinal.

11. The computer program product as recited in claim 8, wherein said procedure to draw infographics for variables not assigned said role of said target comprises identifying clusters of variables to be used to draw a scatter plot in response to said value of continuous variables exceeding said first threshold value.

12. The computer program product as recited in claim 8, wherein said data model includes classifications of variables used in datasets, wherein said classifications comprise a type of variable, a role of said variable, and the level of measurement of said variable.

13. The computer program product as recited in claim 8, wherein the program code further comprises the programming instructions for:
selecting a variable in said same cluster to be paired in a new group with a variable not belonging to said same cluster in response to not comparing all continuous variables belonging to said same cluster or not belonging to said same cluster.

14. The computer program product as recited in claim 8, wherein the program code further comprises the programming instructions for:
forming a data model for variables not previously associated with a data model using a level of measurement and a role assigned to said variables.

15. An infographics generator, comprising:
a memory for storing a computer program for automatically drawing infographics; and
a processor connected to said memory, wherein said processor is configured to execute program instructions of the computer program comprising:
populating a database with variables and associated data models based on previous assignments of levels of measurements and roles of variables;
receiving selected variables from a dataset to be utilized for generating infographics from a computing device by an infographics generator;
utilizing said data models stored in said database connected to said infographics generator for classifications of variables used in datasets, wherein said classifications of variables used in datasets comprise a type of variables, a role of variables, and a level of measurement of variables;
identifying an appropriate data model stored in said database based on matching a name of a variable selected by a user with a name of a variable listed in said data model using natural language processing;
parsing said dataset to obtain metadata;
automatically implementing a procedure to draw infographics, by said infographics generator, for variables not assigned a role of a target using said metadata and said data model associated with each of said variables not assigned said role of said target in response to said variables not being assigned said role of said target;
automatically implementing a procedure to draw infographics, by said infographics generator, for variables assigned said role of said target using said metadata and said data model associated with each of said variables assigned said role of said target in response to said variables being assigned said role of said target;
determining if there is a value of a continuous variable that exceeds a first threshold value; and
performing a pair-group search strategy to reduce a complexity of correlation analysis and in selecting appropriate continuous variables to be drawn thereby improving clarity and understandability of infographics in response to said value of said continuous variable exceeding said first threshold value, wherein said pair-group search strategy comprises:
grouping continuous variables with a value that exceeds said first threshold value;
computing a correlation rate for each pair of continuous variables by computing a Euclidean distance or a cosine distance between said pair of continuous variables, wherein said correlation rate measures show strong a relationship is between two variables;
identifying a pair of continuous variables as belonging to a same cluster in response to said computed correlation rate exceeding said first threshold value; and
identifying a pair of continuous variables as not belonging to said same cluster in response to said computed correlation rate not exceeding said first threshold value.

16. The infographics generator as recited in claim 15, wherein the program instructions of the computer program further comprise:
determining whether a value for each of said received variables not associated with said data model is less than a second threshold value;
assigning a level of measurement to be continuous for a first variable not associated with said data model without having a value that is less than said second threshold value;
assigning a level of measurement to be nominal for a second variable not associated with said data model having a value that is less than said second threshold value; and
assigning each of said received variables not associated with said data model to have a role of input.

17. The infographics generator as recited in claim 15, wherein said procedure to draw infographics for variables not assigned said role of said target comprises one or more of the following selected from the group consisting of: drawing a relationship map for variables with assigned levels of measurement of nominal and ordinal, drawing a histogram for each variables with an assigned level of measurement of continuous, drawing a pie graph for each variable with an assigned level of measurement of nominal, and drawing a bar graph for each variable with an assigned level of measurement of ordinal.

18. The infographics generator as recited in claim 15, wherein said procedure to draw infographics for variables not assigned said role of said target comprises identifying clusters of variables to be used to draw a scatter plot in response to said value of continuous variables exceeding said first threshold value.

19. The infographics generator as recited in claim 15, wherein said data model includes classifications of variables used in datasets, wherein said classifications comprise a type of variable, a role of said variable, and the level of measurement of said variable.

20. The infographics generator as recited in claim 15, wherein the program instructions of the computer program further comprise:
selecting a variable in said same cluster to be paired in a new group with a variable not belonging to said same cluster in response to not comparing all continuous variables belonging to said same cluster or not belonging to said same cluster.

\* \* \* \* \*